United States Patent [19]
Cramer

[11] 4,033,113
[45] July 5, 1977

[54] STEAM GENERATION WITH COAL
[75] Inventor: Frank B. Cramer, Mission Hills, Calif.
[73] Assignee: Clean Energy Corporation, Burbank, Calif.
[22] Filed: Oct. 3, 1975
[21] Appl. No.: 619,387

Related U.S. Application Data

[62] Division of Ser. No. 512,540, Oct. 7, 1974, Pat. No. 3,933,128.
[52] U.S. Cl. .................. 60/39.02; 60/39.46 R
[51] Int. Cl.² ........................ F02C 3/20
[58] Field of Search .............. 23/288 A; 48/92; 110/1 J, 1 R; 122/4, 32, 33; 196/118; 201/11; 202/219; 208/107; 423/210.5; 60/643, 645, 39.02, 39.46 R

[56] References Cited
UNITED STATES PATENTS

| | | | |
|---|---|---|---|
| 3,647,358 | 3/1972 | Greenberg | 423/210.5 |
| 3,916,617 | 11/1975 | McKenzie et al. | 60/39.02 |
| 3,933,127 | 1/1976 | Arps | 423/210.5 |

Primary Examiner—John J. Vrablik
Assistant Examiner—L. J. Casaregola
Attorney, Agent, or Firm—Louis J. Bachand

[57] ABSTRACT

Heat is generated by combustion of coal or like carbonaceous fuel reactant dissolved in molten salt. The generated heat is transferred to steam by an alternating sequence of direct contact heat exchanges of the salt and steam with a common heat transfer medium.

54 Claims, 10 Drawing Figures

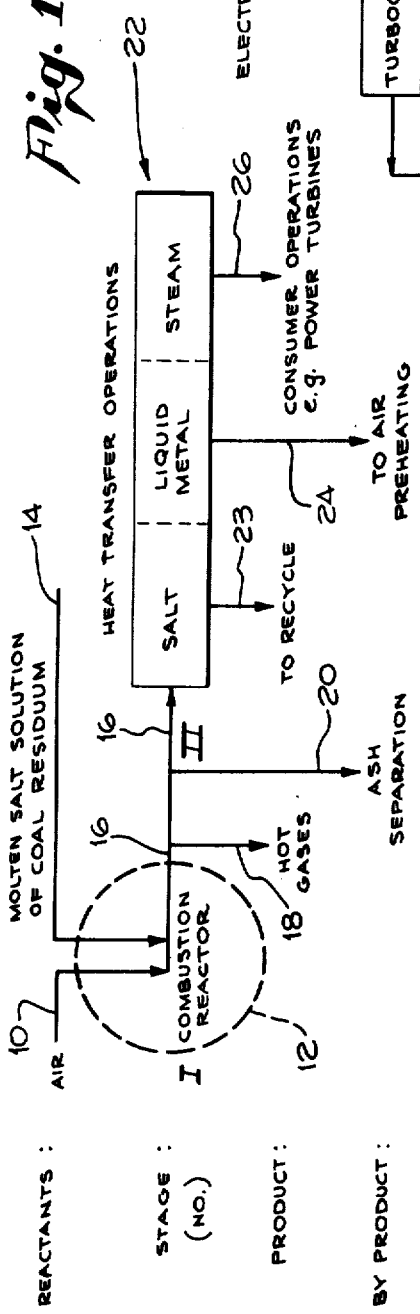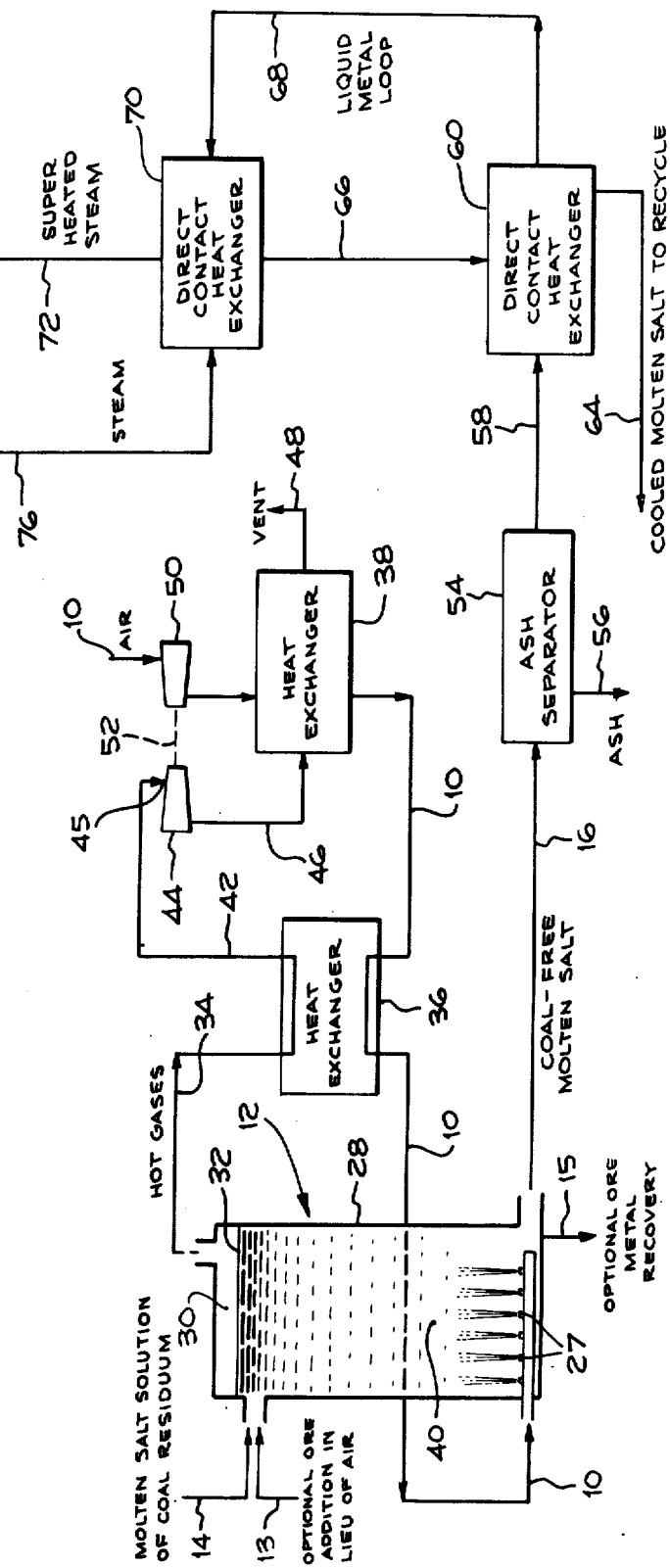

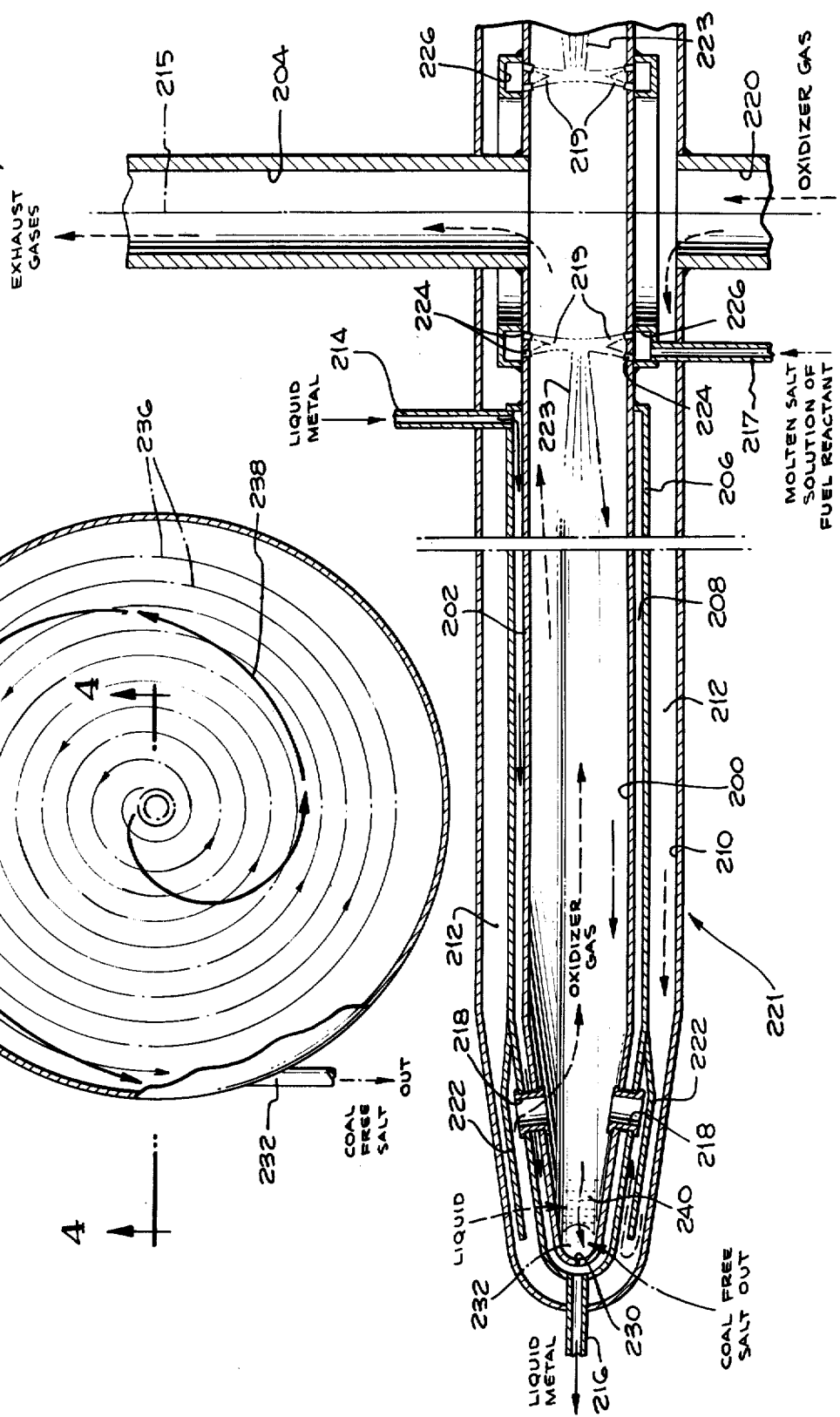

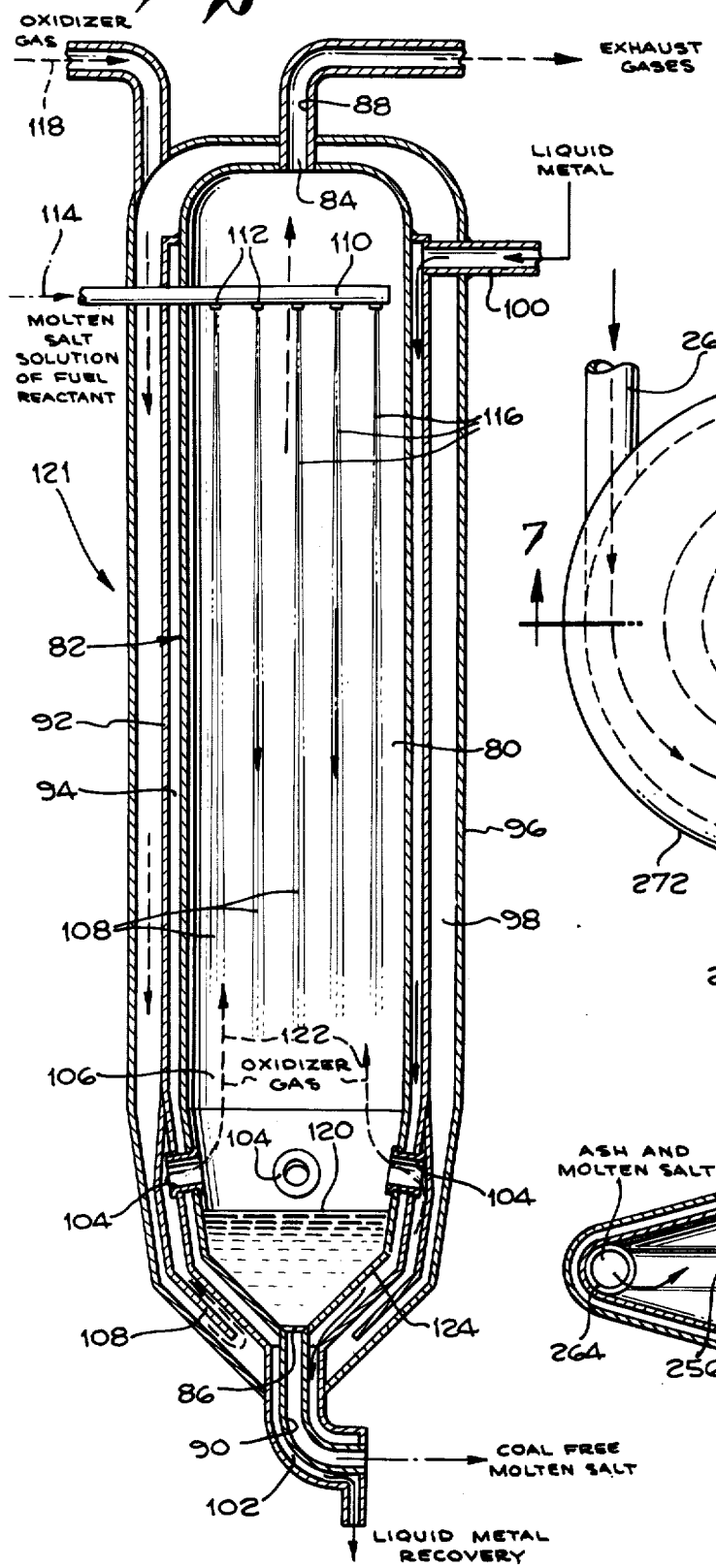
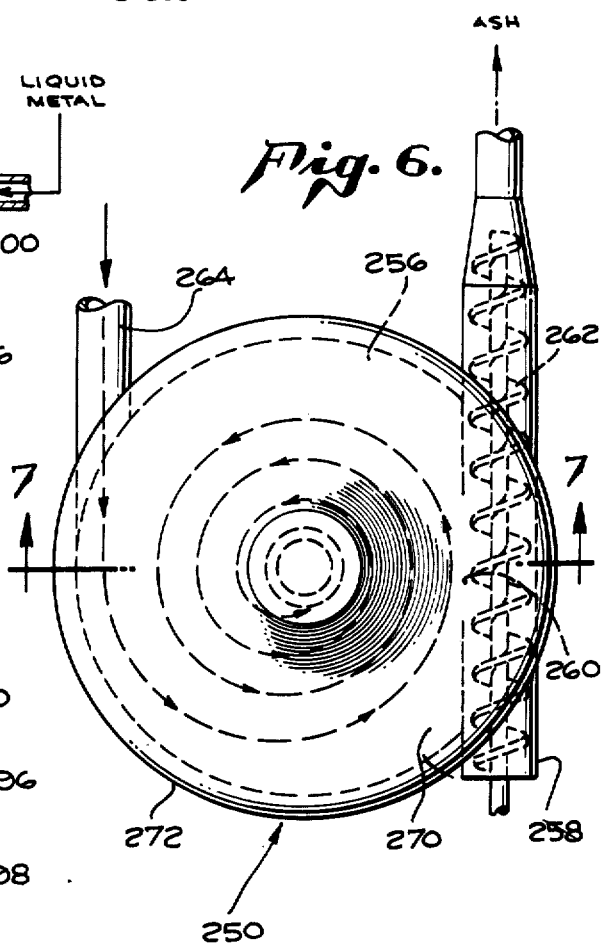
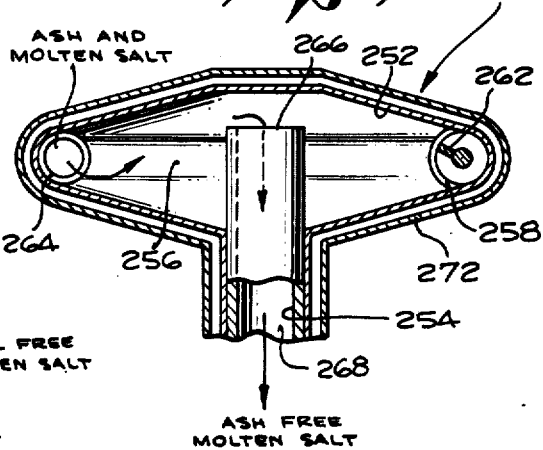

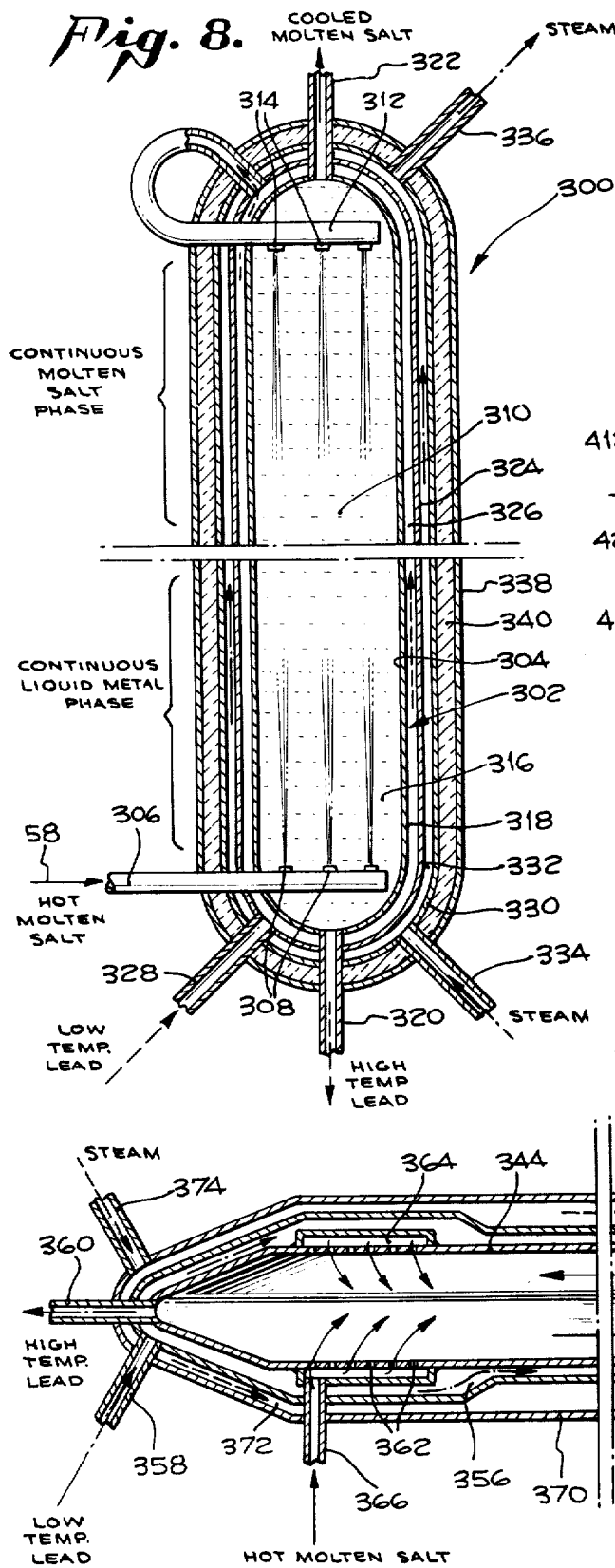
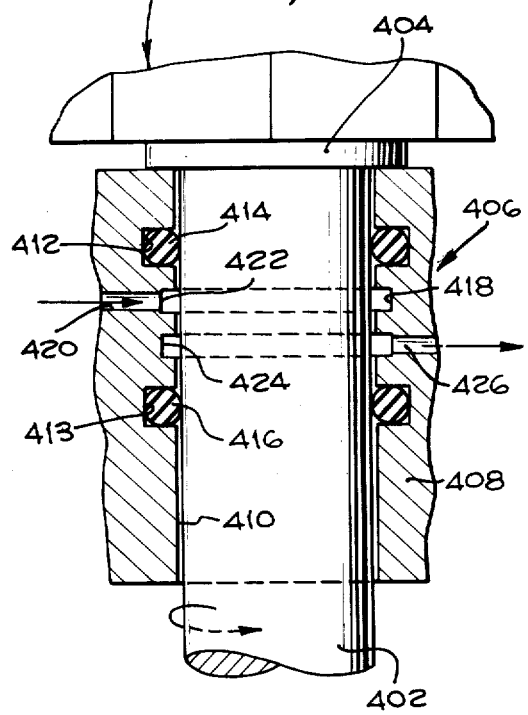
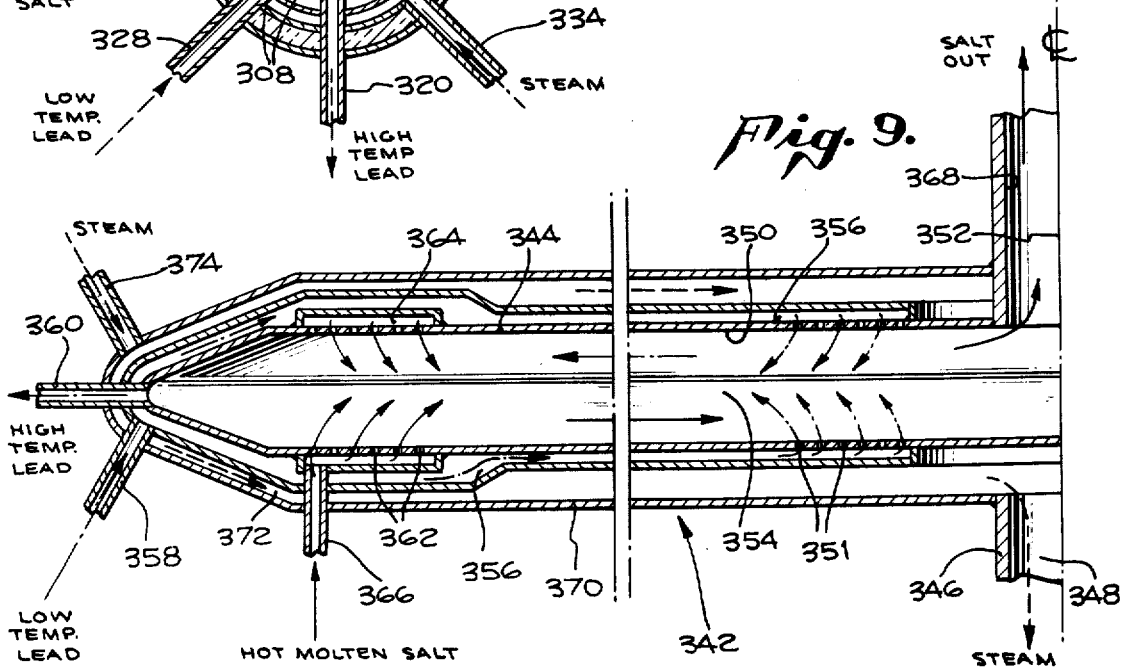

STEAM GENERATION WITH COAL

This is a division of application Ser. No. 512 540, now U.S. Pat. No. 3,933,128 filed 10/7/74.

BACKGROUND

This invention has to do with process and apparatus for the generation and recovery of heat from highly aromatic, generally refractory carbonaceous fuel reactants, particularly from coals and residual oils. Such fuel reactants may be "char" derived from pyrolysis or other rigorous treatment of bituminous, or sub-bituminous coals or heavy crude oil residue feedstocks, or be anthractie coals or like materials typically characterized by being predominantly carbon i.e. carbonaceous and predominantly aromatic rather than aliphatic in their carbon structure and generally refractory i.e. highly resistant to thermal decomposition.

More particularly, the invention relates to process and apparatus highly advantageous for obtaining maximum heat from such fuel reactants for production of steam useful e.g. for power turbines, while simultaneously precluding the release of atmospheric contaminants, particularly $NO_x$, and reducing the size and complexity of capital equipment relative to conventional heat and steam generation facilities, and with minimum heat loss through the process steps. In general, the process involves significant breakthroughs in the generation of heat from the mentioned fuel reactants and numerous innovations in the handling of such heat for maximum benefit at minimum cost.

At the outset it must be mentioned that the process overall is readily conducted at relatively low temperatures i.e. less than 1000° C, temperatures below those at which significant formation of nitrogen oxides takes place. Thus the process achieves the long sought goal of efficient conversion of e.g. coal to heat, without concomitant atmospheric contamination. In particular embodiments the use of nitrogen containing gases such as air is avoided, by the use, instead, of solid oxidizers such as metal bearing ores, but in all embodiments low reaction temperatures, possible through catalytic action and solution reaction occurring in the process, enable efficient combustion of fuel reactant without substantial co-production of $NO_x$.

PRIOR ART

The need to obtain fully from coal and oil residues the latent heat energy and/or chemicals content has been long manifest, but technological and economic difficulties have together or separately heretofore limited heat and chemical production from coal and oil residues except in a few well-trodden areas. The science of coal combustion for maximum heat has been well developed, but is currently undergoing revision as stringent air and water pollution standards are settled upon municipalities and industrial users. So at a time when the country's most abundant natural fuel resource is most needed, to provide both chemicals and heat energy, owing to the vagaries of the international oil market, the contamination factors inherent in coal consumption i.e. sulfur oxides and nitrogen oxides emitted into the atmosphere are increasingly less tolerated, posing the dilemma of greater need and less legal ability to derive more heat and energy and chemicals from coal. Similarly, it is now highly important to make the best and highest economic use of all fractions of crude oil meaning that the carbonaceous residues from which all possible chemicals have been obtained by earlier processing must be converted as much as possible to usable heat, also without lessening air quality.

In general, previous efforts at meeting these needs have been directed at improvements in reaction rate e.g. through catalysis, downstream modification of exhaust gases to remove contaminants and other rather specific additives to the overall process which have predictably produced only rather specific narrow benefits. In the matter of heat transfer from the reaction mass to steam e.g. for turbines, conventional heat exchange approaches remain with all the inherent inefficiencies and temperature limitations of limited surface heat transfer through fixed surface heat exchangers.

The United States is thereby being deprived of full use of its most significant fuel resource: Coal. Power plants in particular have skyrocketed in cost and complexity as utilities have been forced to add pollution control equipment which rivals in cost the power plant itself. More advanced technology such as nuclear energy has its own critics and is fraught with administrative and environmental delays.

It is into this area that the present invention takes a significant step. The present process and apparatus through adaptations of solution and catalytic reactions, in a recyclable salt matrix, effect heat production at super-rapid rates and transfer this heat with great rapidity and efficiency through a dispersible and reformable heat transfer fluid in direct contact with the salt matrix on the one hand and the steam for power generation on the other hand, and alternately. The rate of combustion of the coal or like residual feedstock is so rapid that capital equipment is able to be reduced in size and costs thereof are commensurately reduced. Moreover the temperatures of combustion are not favorable to $NO_x$ formation and solid contaminants such as sulfur and ash are retained wtihin the salt matrix and not vented to the atmosphere, but are removed at a selected controllable point in the process cycle for minimum contamination and maximum productivity.

SUMMARY

It is an object therefore of the present invention to provide process and apparatus in which reaction conditions and heat handling stages are complementary and integrated for maximum efficiency in combustion and heat transfer. Other objects include conducting the combustion reaction at temperatures and under conditions:

a. limiting generation of $NO_x$, b. providing readily separable ash and other by-products, c. capturing heat directly during combustion in the reaction medium, d. effecting heat transfer directly from the reaction medium to a heat transfer medium in intimate contact therewith, e. effecting a further transfer of heat from the heat transfer medium to steam directly and out of contact with the reaction medium, f. protecting the rection apparatus from undue heat emanations from the reactor while preheating reactants and/or steam; and g. in certain embodiments simultaneously reducing a metal bearing ore while oxidizing the fuel reactant; and h. differentially passing streams of reactants, products and the heat transfer medium to define reaction times and maximize heat transfer, and utilizing heat energies of exhaust gases in effecting the process.

Other objects will be evident from the following description of process steps and apparatus.

GENERAL SUMMARY OF THE PROCESS

In accordance with the invention the foregoing and the other objects of the invention are realized in the process for the generation and recovery of heat from highly aromatic, refractory carbonaceous fuel reactants by oxidizing the fuel in a molten salt matrix within the reaction zone and recovering heat of combustion from the salt matrix, which includes the step of dissolving the fuel in the salt in advance of fuel oxidation. The salt solution typically comprises from 2 to 10% by weight of the fuel reactant and has a temperature during oxidation between 600° C and 1000° C. The fuel reactant may comprise coal or other feedstock substantially free of volatiles at 600° C and 10 atmospheres.

ORE REDUCTION — COMBUSTION

In one embodiment, there is contemplated adding a metal oxide to the salt-fuel reactant solution to effect the oxidation while effectively simultaneously reducing the oxide to free metal. The metal oxide is preferably selected from among naturally occurring metal oxides of metals of Group VII of the Periodic Table and particularly iron ore or nickel ore and the process thus contemplates obtaining free iron and/or nickel from the salt solution.

OXIDIZING GAS COMBUSTION

In other embodiments an oxidizing gas is passed through the salt solution to effect the oxidation. Such gas is typically free oxygen-containing and may be oxygen per se, oxygen enriched air, or air. In these embodiments, the oxidizing gas is generally treated by preheating and precompressing in advance of passage through the salt solution. For this purpose using exhaust gases e.g. by expanding and cooling these exhaust gases through an expansion motor, and compressing the oxidizing gas with the mechanical energy derived from the expansion. Additionally, there may be mentioned heat exchanging the hot combustion gases with the compressed oxidizing gas being passed to the salt-fuel solution, in advance of expanding and cooling the hot combustion gases; and further the expanded and cooled combustion gases may be first heat exchanged with the compressed oxidizing gas in advance of heat exchanges with the hot combustion gases.

MOLTEN SALT RECYCLE

The process further includes recycling the molten salt solvent and reaction matrix for the fuel reactant to and from the reaction zone, removing heat from the salt outside the reaction zone, and also recharging the molten salt with fresh fuel reactant outside the reaction zone.

Where the fuel reactant is sub-anthracite coal e.g. bituminous, sub-bituminous or lignite orders of coal, the invention process may further include pretreating the fuel reactant in the molten salt in advance of the reaction zone to substantially free the reactant of components volatile at 400° C and 10 atmospheres.

HEAT TRANSFER

Heat transfer according to the invention may be effected by heat exchanging the salt outside the reaction zone with a high specific heat fluid which may be passed in e.g. indirect heat exchange relation over the exterior surfaces of the reaction zone to absorb emanated heat and protect the reaction zone support structure. The high specific heat fluid typically is liquid, immiscible with the molten salt and of a different density therefrom, the process including direct contact heat exchanging the salt and this liquid. The liquid may be metallic and the process then includes passing the salt and metallic liquid in contact therewith through a heat exchange zone. For example, the process includes in preferred embodiments passing the salt and metallic liquid countercurrently along an extended heat exchange path and differentially at opposite ends of the path to maintain relatively longer contact of metallic liquid with the salt at maximum temperature and relatively shorter contact thereof with minimum temperature salt along the path. In particular embodiments, the metallic liquid is dispersed throughout this salt in a multiplicity of different mass droplets, and the process provides for subjecting the droplets to opposing forces along the path, one of which forces is directly proportional to the specific mass of the droplets, and segregating the droplets by their specific mass for separation selectively of the greater mass droplets. The droplets may be subjected to gravity as the one force and entrainment in the salt flowing countercurrently along the droplet path as the other path, and aggregating and coalescing the droplets to a mass sufficient to overcome the entraining force of the moving salt, for segregation and separation. The gravity force and the entraining force may be approximately balanced along the droplet path at the reaction zone region of maximum salt temperature to maximize metallic liquid dwell times and thus heat transfer from the salt to the metallic liquid in this region.

In other embodiments the droplets may be subjected to centrifugal force as the one force and entrainment in the salt flowing countercurrently along the droplet path again as the other force and the process then includes aggregating and coalescing the droplets to a mass sufficient to overcome the entraining force of the moving salt, for segregation and separation. As in the gravity embodiment, the two forces, centrifugal force and entraining force, may be approximately balanced along the droplet path at the region of maximum salt temperature to maximize metallic liquid dwell times and thus heat transfer from the salt to the metallic liquid in this region.

STEAM

The high specific heat fluid being typically nonaqueous, the process includes following heat transfer thereto from the salt, subsequently heat exchanging the high specific heat fluid with steam to transfer the molten salt heat to the steam through the high specific heat fluid as a specific instance of direct contact heat exchanging a salt immiscible liquid with steam to transfer the molten salt heat to the steam through the immiscible liquid. In preferred embodiments the immiscible high specific heat liquid is the mentioned metallic liquid and the process further includes circulating the metal liquid through the salt in direct contact heat exchange relation and in sequence through steam, and returning the metallic liquid to the salt for continuing heat transfer from the salt to the steam thereby.

In an integrated form of the process then, the molten salt is circulated to and from the reaction zone to bring fresh charges of fuel reactant into the zone and heat out of the zone in a reaction stream loop, and the metallic liquid is circulated sequentially through the circulating salt in differential flow relation and through steam and back to the salt in a heat transfer loop, and, thus-heated steam is circulated to a steam energy consuming zone and back in a steam loop to the heat transfer loop for regeneration.

The process includes use of lead or the metallic liquid, and also ultimately dispersing the lead into droplets in the salt for reception of heat and coalescing for separation from the salt. Accordingly when using lead heat transfer medium, the invention includes maintaining the differential flow of salt and the lead droplets therein by balancing forces acting on the lead in a manner relatively increasing the lead exposure to maximum temperature salt and relatively decreasing the lead exposure to minimum temperature salt and responsive to the mass of the droplets so that upon coalescense of the droplets they are separable from the salt.

REACTION ZONES

The liquid lead may be passed over the exterior surfaces of the reaction zone to retain heat normally emanated from the reaction zone in the process. In such embodiment, the process may further include passing a free oxygen containing gas in indirect heat exchange with the liquid lead at the exterior surface of the reaction zone, and the passing of the gas thus preheated into the reaction zone to oxidize the fuel reactant therein.

The reaction zone is typically vertically extended in one embodiment, and the process then includes within the reaction zone raining molten salt-fuel reactant solution in droplet form through an updraft of air as the oxidizing gas, and collecting molten salt containing the heat of combustion at the lower reaches of the reaction zone. In such a zone the process further includes balancing the gravitational forces acting on the falling molten-salt-fuel reactant solution droplets with the force of air to suspend temporarily the droplets above the lower reaches of the reaction zone for a time to substantially free the salt of fuel reactant.

In alternative reaction zone design embodiments, the reaction zone may be discoid and the process then includes introducing the molten salt-fuel reactant centrally thereof for outward passage through the reaction zone in droplet form, introducing air tangentially at the periphery of the reaction zone along a spiral path extending toward the center of the zone in a manner entraining the salt solution-fuel reactant droplets for passage toward the center of the zone, and simultaneously subjecting the droplets to centrifugal forces opposing such passage, and collecting molten salt containing heat of combustion at the peripheral reaches of the reaction zone. It is further contemplated to balance the centrifugal forces acting on the molten salt-fuel reactant solution droplets with the force of air to suspend temporarily the droplets inwardly of the reaction zone periphery for a time to substantially free the salt of fuel reactant.

PREFERRED PROCESS SUMMARY

In summary of one of the preferred embodiments of the process the fuel reactant dissolved in the salt is oxidized with free oxygen-containing gas in a vertically extended reaction zone, the process including within the reaction zone raining molten salt-fuel reactant solution in droplet form through an updraft of the gas, and collecting molten salt containing the heat of combustion at the lower reaches of the zone, the gas updraft balancing with the force of the gas the gravitational forces acting on the falling molten salt-fuel solution droplets to suspend temporarily the droplets above the lower reaches of the reaction zone for a time sufficient to substantially free the salt of fuel reactant, e.g. 0.2 to 2 seconds.

In summary of another of the preferred embodiments of the process, the fuel reactant is oxidized with a free oxygen-containing gas in a discoid reaction zone and the process includes introducing the molten salt-fuel reactant centrally thereof for outward passage through the reaction zone in droplet form, introducing the gas tangentially at the periphery of the zone along a spiral path extending toward the center of the zone in a manner entraining the salt solution fuel reactant droplets for passage toward the center of the zone, and simultaneously subjecting the droplets to centrifugal forces opposing such passage, and collecting molten salt containing heat of combustion at the peripheral reaches of the reaction zone, thus the force of the gas balancing the centrifugal forces acting on the molten salt-fuel reactant solution droplets to suspend temporarily the droplets for a time sufficient to substantially free the salt of fuel reactant e.g. 0.2 to 2 seconds.

INTEGRATED OPERATION SUMMARY

In summary then, the process of the invention includes forming a solution in molten salt of from 2 to 10% by weight of highly aromatic, refractory fuel reactant, passing the salt-fuel reactant solution in dispersed form through a counter-flowing free-oxygen containing gas stream in a reaction zone at a temperature between 600° C and 1000° C and a pressure between about 1 and 25 atmospheres, and at a differential rate decreased in proportion to relatively greater amount of fuel reactant in the salt to be combusted and for a time sufficient to combust substantially all of the fuel reactant from the salt, recovering a major portion of the heat produced by fuel reactant combustion in the salt, collecting the salt and transferring heat from the salt to liquid metal heat transfer medium in direct contact therewith outside the reaction zone, retransferring the heat from the heat transfer medium by direct contact to steam for consumer operations, recirculating the molten salt with a fresh charge of fuel reactant to the reaction zone, recirculating the liquid metal heat transfer medium between direct contact alternately with said salt and said steam, and purging mineral wastes and atmospheric contaminants from the recirculating salt. The process thus defined may further include dispersing the salt-fuel reactant solution as droplets in the gas, and simultaneously subjecting the solution droplets to countervailing forces in relatively balanced relation to provide time for substantially complete combustion of the fuel reactant in the reaction zone e.g. a dwell time for the salt solution of the reactant of between 0.2 and 2 seconds. Thus when the reaction zone is vertically extended, the countervailing force to the gas is gravitational by virtue of the introduction of the droplets at the top of the reaction zone to fall to the bottom thereof. And when the reaction zone is discoid, the countervailing force is centrifugal from the introduction of the droplets at the center of the zone and the entrainment of the droplets in spirally moving gas passing from the periphery toward the center of the zone. For this purpose the process includes jetting the salt-fuel reactant in angularly colliding streams within the reaction zone to fan the solution and form the droplets thereby. Additionally in this embodiment, the gas and solution droplets may travel spiral paths of different pitch, the spiral path of the droplets being greater and being the vector sum of the droplet entraining force and centrifugal force components.

APPARATUS ASPECTS

Apparatus is provided for carrying out the foregoing process in accordance with the present invention. Apparatus therefore is provided for the generation and recovery of heat from highly aromatic, refractory carbonaceous fuel reactants, the fuel reactants being predissolved in a molten salt solvent therefor, the apparatus comprising a reactor defining a through passage for the salt solution of fuel reactant, means to pass a free oxygen-containing gas through the reactor differentially to the salt fuel reactant solution in combustion heat-absorbing relation, and means beyond the reactor to transfer the heat from the salt, including a high specific heat fluid, and means to recharge the molten salt with fresh fuel reactant following heat transfer and to return the recharged salt to the reactor. The apparatus may also include means to pass the high specific heat fluid across the external surface of the reactor to absorb heat emanated therefrom, and means to pass the oxygen-containing gas in indirect heat transfer relation with fluid, to preheat the gas for the reactor.

VERTICAL REACTOR

In particular embodiments the reactor may be generally cylindrical, and include a first external jacket enclosing the reactor and a second external jacket enclosing the first jacket; the first jacket defining a flow passage for the heat transfer fluid; and the second jacket communicating with the reactor interior and defining a flow passage for the gas to the reactor interior. The reactor thus described may terminate in a salt receiving receptacle having a salt outlet opposite the salt fuel solution inlet and further including gas inlets adjacently inward of the receptacle. The invention further contemplates the reactor apparatus including means to disperse the salt fuel solution into droplets moving differentially past the gas within the reactor. The reactor may be extended and the salt fuel solution introduced at one terminus of the reactor, the apparatus then including means introducing the gas through an inlet at the opposed terminus of the reactor. Accordingly the reactor may be vertically extended and the salt fuel solution droplet-dispensing inlet may be located at the upper end of the reactor and the apparatus also include means to pass gas upward through the reactor at a rate suspending the droplets in dynamic equilibrium in a zone adjacent to the gas inlet to the reactor.

In the foregoing and other embodiments of the invention the gas introduced into the reactor may be preheated indirectly by heat of combustion in advance of its introduction into the reactor. Accordingly heat transfer fluid may be passed between the reactor and the gas as an indirect heat transfer medium by appropriate means such as a jacket enclosing the reactor.

DISCOID REACTION

In alternative embodiments the reactor is discoid in configuration and the salt-fuel solution droplet dispensing inlet is located at the central portion of the reactor and the apparatus further includes means to pass the gas inward through said reactor at a rate and in a direction suspending the droplets in dynamic equilibrium in an anular zone adjacent the gas inlet to the reactor. For this purpose the discoid reactor may further include at its periphery a tangentially oriented gas inlet means and a gas outlet means at the central portion thereof, each arranged to pass gas along a spiral path inwardly through the reactor. Accordingly the discoid apparatus embodiment may include opposed upper and lower salt-fuel solution inlet nozzles annularly related to intersect streams of the solution for dispersion thereof in droplet form within the reactor. Upper and lower plenums may be provided communicating with the solution inlet nozzles for the purpose of supplying fuel-salt solution thereto. There may be further provided salt collector means located peripherally of the reactor in receiving relation to salt passing through the gas. Additionally there may be provided means to preheat gas to be introduced into the discoid reactor with heat emanated from the reactor. Typically the reactor includes external support structure and the invention contemplates providing also means to pass heat transfer fluid across the reactor external surface to absorb heat emanated from the reactor to protect the external support structure, the apparatus further including means to transfer heat indirectly from the heat transfer fluid to the gas to be introduced into the reactor, to preheat the gas.

In specific embodiments then, the apparatus includes a first jacket generally enclosing the discoid reactor, a second jacket generally enclosing the first jacket, the first jacket defining a passage for the heat transfer fluid in heat transfer relation with the reactor; the second jacket defining a through passage in heat transfer relation to the first passage for gas to be introduced into the reactor; and additionally a gas inlet port communicating the gas passage jacket with the reactor interior in fluid free relation through the first jacket and radially inward of the salt collector.

EXHAUST GAS UTILIZATION

The invention contemplates utilization of exhaust gases from the reactor combustion and for this purpose the apparatus includes means to pass the exhaust gases from the reactor, means to expand and do work with the exhaust gases including compression and heating of free oxygen containing gas to be introduced into the reactor. For this purpose there may be provided a turbo-expander and compressor and means to pass exhaust gases through the expander and means to pass free oxygen containing gas through the compressor, the expander being operatively coupled to the compressor to compress the free oxygen containing gas with the expansion energy of the exhaust gases. The invention further contemplates means to heat exchange the exhaust gases before and after their expansion with compressed free oxygen containing gas.

SEPARATION OF SOLID CONTAMINANTS

An important aspect of the present apparatus is provision of means for the removal of solid contaminants including particularly fly ash and other mineral matter such as separable sulfur compounds. For this purpose the invention provides means to separate insoluble mineral matter left in the salt from the reaction, from the salt, including a generally cylindrical settling chamber having a tangential inlet for the salt and mineral matter mixed therewith, and an axial outlet for the salt above the bottom of the chamber, means to introduce the mixture at a rate imparting a circular flow of the mixture and a centrifugal force driving the mineral matter preferentially to the chamber perimeter, and means to draw off the mineral matter at the chamber perimeter. In further detail the mineral matter separation device may include a positive displacement means communicating with the chamber perimeter and adapted to receive and remove mineral matter there. The positive displacement means may comprise a rotating screw.

DIRECT CONTACT HEAT EXCHANGERS

A further important aspect of the present invention is the provision of highly efficient heat transfer through direct contact heat exchanges of an innovative design. For this purpose the invention provides a heat transfer means comprising a heat exchanger and further including means to pass a high specific heat fluid through the heat exchanger with the salt obtained from the reactor, and in heat transferring relation. For this purpose the invention provides means to recirculate molten salt from the reactor to the heat exchanger. The high specific heat fluid may comprise metallic liquid and the apparatus may include means to pass the liquid into and out of exchange contact with the salt in the heat exchanger and additionally second heat exchange means to transfer heat from the metallic liquid to steam. Accordingly the invention provides loop means including the first and second heat exchangers and adapted to recirculate the metalic liquid between the heat exchangers. The first heat exchanger may be a direct contact heat exchanger and the second heat exchanger may also be a direct contact heat exchanger. In these embodiments the first heat exchanger comprises an extended exchange chamber and means to pass the salt and the metallic liquid heat transfer fluid differentially through the exchange chamber. Such first heat exchanger comprises a vertically elongated exchange chamber having a metallic liquid inlet at the upper portion thereof and a metallic liquid outlet at the lower portion thereof, the salt chamber further having a salt inlet at the lower portion thereof and a salt outlet at the upper portion thereof for passage of salt upwardly through the chamber, and means at the metallic liquid inlet to disperse the liquid into and through the upward moving salt and at the liquid outlet to recover said liquid, coalesced, and containing the transferred heat of the salt. In preferred embodiments the metallic liquid is molten lead.

The second heat exchanger comprises means to intimately interdisperse the metallic liquid and steam to transfer the salt heat contained in said metallic liquid thereby to the steam. The second heat exchanger further comprises means to intimately interdisperse the molten lead and steam, to thereby transfer the salt heat contained in the lead to the steam. The apparatus then further includes a steam turbine adapted to receive steam from a second heat exchanger, and means to recycle steam from the steam turbine to the second heat exchanger for reheating in a steam loop.

In particular embodiments provision is made for protecting the external support structure of the first heat exchanger including means to pass relatively cooler heat transfering metallic liquid over the external surface of the first heat exchanger to absorb heat emanated from the heat exchanger to protect the external support structure. For this purpose there may be provided a first jacket generally enclosing the first heat exchange means the jacket defining a flow passage for the metallic liquid. Further, means may be provided to pass processed steam in heat transfering relation across the external surface of the first heat exchanger. Therefore there may be provided a second jacket generally enclosing the first jacket and defining dimension to passage for process steam in heat transfer relation with metallic liquid in the first jacket, the metallic liquid thereby acting to transfer heat emanated from the first heat exchanger to the process steam.

There is further provided in accordance with the invention a highly advantageous sealing means particularly adapted to protection of the high temperature, highly corrosive solutions contemplated in the invention against loss from process equipment having a motor driven shaft entering through an equipment wall, the means comprising a block surrounding a wall-adjacent external portion of the shaft and having spaced anular recessed adapted to receive first and second O-rings in sealing engagement with the shaft and the block, the first O-ring sealing the process equipment; and a fluid channel between the recesses, and means to pressurize the channel and the O-rings with fluid in leakage-blocking relation through the first O-ring. The fluid channel for pressurizing the first O-ring may extend spirally within the block and coaxially with the shaft.

ORE REDUCTION APPARATUS

As noted above the invention contemplates simultaneously reducing metal bearing ore while oxidizing the fuel reactant. For this purpose apparatus is provided for the reduction of metal-bearing ore with highly aromatic, refractory carbonaceous fuel residuals, the fuel residuals being dissolved in a molten salt solvent therefor, the apparatus comprising a reactor defining a through-passage for the fuel residual solution, means to disperse metal ore in the solution at temperatures between 600° and 1000° C. and in reducing reaction proximity to the fuel residuals for a time sufficient to substantially completely reduce the ore to metal and to oxidize the fuel residual to gases. The apparatus may further include means to recirculate the molten salt to and from the reactor, means to make fresh additions of fuel residuals to the salt, means to purge the salt of mineral matter beyond the reactor, means to treat gases produced in the process to derive the heat energy therefrom including an expansion motor and means to pass the processed gases from the reactor to the expansion motor.

BRIEF DESCRIPTION OF THE DRAWINGS

FIG. 1 is a schematic flow sheet of the process showing major operations;

FIG. 2 is a more detailed schematic of the process;

FIG. 3 is a plan view, partly broken away, of the discoid reactor according to the invention;

FIG. 4 is a view in vertical section of the discoid reactor taken on line 4—4 in FIG. 3;

FIG. 5 is a view in vertical section of the vertical reactor according to the invention;

FIG. 6 is a plan view, partly broken away to shown underlying parts of the ash and mineral matter removal apparatus;

FIG. 7 is a view taken on line 7—7 of FIG. 6;

FIG. 8 is a view in vertical section of vertical direct contact heat exchanger according to the process;

FIG. 9 is a view in vertical section of a discoid direct contact heat exchanger according to the process; and, FIG. 10 is a view generally in vertical section of a high pressure seal according to the invention.

DETAILED DESCRIPTION

Introduction

It is the purpose of the present invention to make practically usable in the present social, economic and ecologic environment the vast quantities of residual carbonaceous fuel reactants derived from coal mining and petroleum processing. The ecological disposition of highly carbonaceous fuel reactants has proved difficult within the constraints imposed on fly ash, sulfurous gases and nitrogen oxide emissions and this has limited the utility of several processes intended to obtain valuable hydrocarbon products from coal. Thus in several of the known procedures for liquefying or gasifying sub-anthracite coal, there remains after the relatively more reactive fraction has been converted to the desired products, a residuum of refractory, less reactive highly carbonaceous material which, practically speaking, must be burned or accumulated for land fill or other less desirable purposes.

The present process and apparatus is adapted to taking up where existing technology leaves the coal or oil residual processor. By dissolving in molten salt the char from coal pyrolysis or other highly carbonaceous residual of coal or petroleum processing, and heating in accordance with the invention, heat in a usable form is obtained, i.e. generally from 85 to 98 percent of the heat output is in the salt matrix where it can be economicaly put to use in producing steam by appropriate heat transfer steps, also described herein, and thus relatively less heat is in the stack gases where extensive recovery is difficult and/or not economic. Meantime the coal or like residuum is substantially completely burned leaving the salt available for reuse, following separation of ash and other solid e.g. sulfur products by techniques to be subsequently explained herein. A further benefit of the salt matrix in addition to heat conservation and easy separation of ash and solid contaminants is found in the catalytic effect of salt on the coal residuum combustion reaction. Thus although the salt is present in relatively large amounts e.g. at least 2 and generally 4 to 6 times by weight as much salt as coal or like residuum is present in the reactor, the salt exerts a catalytic effect which enables facile combustion of the residuum at temperatures below 1000° C. which temperatures disfavor formation of nitrogen oxides, even when air is the gas used for combustion of the residuum.

Additionally it will be observed in the ensuing description, that, throughout, speed of reaction of interaction is paramount enabling relatively smaller apparatus than otherwise and heretofore thought necessary for processing huge amounts of coal or like residuals.

The present process therefore integrates several procedures to achieve a high level of social benefit from coal. While the term "coal" will be used generally through the description herein as illustrative and typical of the present process it is to be understood that "coal" herein has reference to coal per se i.e. high orders of coal e.g. anthracite, or to bituminous or sub-bituminous coals and coal derivatives i.e. coals which have been preprocessed to be substantially carbonaceous and highly aromatic in their carbon character and more broadly to analogous coal derivative-like materials, as well to the crude oil or petroleum refining residuals which are highly aromatic in their carbon character, as well. Returning then to the process, the objective is high volumetric efficiency and the low capital costs realizable thereby.

A typical steam-electric power generation plant reaches peak operating capacity during only a fraction of the time it is operated. The daily cycle may run for example from about 30% to 90% of peak capacity. The feed rate of e.g. a medium order of bituminous coal to produce steam for, say, a 50 megawatt rated generator may typically vary from 1.575 to 4.725 kg/second over a 30 to 90% of capacity operating range. Thus a three fold increase in generator laod may require a corresponding three fold increase in fuel, where the feed to the steam generator is merely coal. But it is possible to use much of the coal feed for higher value purposes such as chemicals production, without a commensurate change in power production because while all of the coal feed may be used for heat, most of the heat is derived from the more refractory portion of the coal, while valuable chemicals may be derived from the less refractory, more volatile portions of the coal. For example, if the coal is first hydrocracked in advance of the steam generation step, valuable chemicals are obtained and the total coal feed change needed for a 30% to 90% ratio of power plant operating capacity is increased only 30%, and not trebled as when coal is only burned and not first processed for chemicals. Thus, assuming an operating rate of 30% of capacity the fuel feed would be 10.5 kg/second where 85% of the feed is to be hydrocracked for chemicals and the balance used for heat production. At increased operating rates, e.g. to 90% the hydrocracking percentage can be lowered to 65% and the fuel feed need be increased only to 13.5 kg/second to accommodate the increased use of capacity, that is only about a 30% change in feed rate over the lower capacity situation.

The high volume specific efficiency of the present system relative to conventional steam boiler operations makes it practical to replace existing steam boilers with a combination synthetic petroleum plant and steam generator system which will have double the prior plant capacity but not occupy any greater area than the existing plant site.

The present process incorporates ecologically important removal operations e.g. sulfur compounds and ash well in advance of the exhaustion of gases to the atmosphere and at process points where the concentration of these contaminants (unlike flue gases) is sufficiently great to make their recovery reasonable in cost and in some instances self-supporting through sale of these byproducts or derivatives thereof.

Low capital investment and absence of air pollution are dual desiderata in this invention and the former is realized in part through the use of equipment designs which enable use of lower cost standard steels in construction despite 600° to 1000° C. temperatures in the reactor and heat exchanger. This is achieved by shielding the reactor support structure from reactor heat by a jacketing arrangement in which the jackets are filled with moving fluids used or useful in the process, which absorb heat emanated from the reactor, insulating the support structure and incidentally pre-conditioning system fluids and recovering otherwise wasted heat. In this aspect of the invention the high temperature, pressurized reactor chamber contents are thermally isolated from the structural components carrying the support loads. Lower cost steels can be thus employed and at or near their load tolerances for ordinary or ambient temperatures i.e. at or near maximum load factors. Higher cost, high temperature alloys need only be used for reactor walls and the like.

In the description to follow the energy convervation objectives of the invention are met not only through the use of jackets about the reactors, heat exchangers and piping to preheat the fluid inputs to the system, but also the enthalpy of the exhaust gases from the reactor is utilized to heat the input air or other oxidizer gas and-/or drive a turbine, and the higher temperature components such as reactor and mineral (ash) separators are used for preheating fluids intended for subsequent use including molten salt, molten metal and water/steam fluids.

CARBONACEOUS FUEL REACTANT

The terms "fuel reactant" and "carbonaceous fuel reactant" herein have reference to carbonaceous fuels such as coals including lignite, sub-bituminous, bituminous, subanthracite and anthracite coal, petroleum or coal derived coke, heavy petroleum residuals, tars and chars of coal, petroleum or materials of wood or agricultural origins.

COAL STRUCTURE

In the ensuing discussion reference will be to coal as typical and illustrative of the process feed material. Coal is a polymeric material of extraordinary complexity and at the same time an abundant source of numerous carbon chain fragments. The present invention maintains a single phase of molten salt solvent and coal polymer solute during oxidation and, in preferred embodiments uses coal which has been pretreated to free the relatively reactive portion of the coal molecule which is volatilized from the coal polymer complex e.g. from between 50 and 85% by weight of a typical coal feed is thus relatively reactive. The less reactive, more refractory portion of the coal is not attempted to be converted into volatile hydrocarbons, but is kept in solution and burned in a second reactor in accordance with the invention.

Within the combustion reactor, the less volatile e.g. polyaromatic molecules and coal fragments, herein collectively referred to as coal residuum or residual coal and representing the relatively non-volatile 15 to 50% by weight of a typical coal is intimately mixed with and dissolved in molten salt.

ORE REDUCTION

Alternative to the use of an oxygen containing gas as the oxidizer in combustion apparatus is the use of non-gas forms of oxygen such as solid oxygen compounds. Particularly useful in this regard are ores of useful metals including specifically and notably the naturally occurring ores of Group VIII metals, most importantly iron and nickel ores. These materials exist in great abundance in the United States but the separation of the iron or nickel component is difficult and costly. Therefore the use of these ores as an oxidizer in the present process meets this great need in a single step. Iron, or nickel is separated from its ore by reduction, as char dissolved in molten salt is oxidized. The iron or nickel, freed from its oxygen bonding is collected from the combustion reaction apparatus by separation from the salt, with concomitantly less heat being recovered from the process overall.

ABSENCE OF $NO_x$

At this point another, environmentally significant advantage of the present process may be pointed out. Bearing in mind the fact of combustion of coal in the dissolved state in molten salt, and the catalytic effect of the molten salt on the reaction, as well as the heat storage capacity of the salt, the temperatures within the reactor are enabled to be kept below those temperatures (1000° C.) favorable to the formation of environmentally obnoxious nitrogen oxides ($NO_x$). Thus $NO_x$ is avoided substantially, a uniquely advantageous benefit of the present process over conventional, non-solution coal combustion reactions.

COAL SOLUTION IN MOLTEN SALT

In preparing the coal or like carbonaceous fuel reactant for combustion, it is well to limit the phonomenon of outgassing which occurs when combining coal with molten salt at temperatures above about 800° C. to up to 1200° C. In the present process, the coal is dissolved at lower temperatures e.g. 250° to 500° C. up to about 600° C. and outgassing is avoided. In prior art processes using the aforementioned higher temperatures taught herein to be desirably avoided, pyrolysis of the coal occurs, generating gas, the gas in turn forms a boundary layer on the coal particle surface limiting access of the salt to the particle. This lessens solubilization which will otherwise occur and is a leading cause of much of the prior art having to do with coal-molten salt systems being limited to heterogeneous systems. As noted herein heterogeneous systems are limited in combustion rate by surface reaction considerations. In the present process, the use of relatively lower (than pyrolysis) temperatures to achieve the initial coal solution, eliminates outgassing and produces a homogeneous solution which may be passed to the combustion reactor directly or pretreated to recover volatiles of value in the coal.

MOLTEN SALT SYSTEMS

The molten salt is inorganic, ionic and has a melting point below the range of reaction temperatures e.g. between 200° and 500° C. Mixtures of salts may be used, particularly to take advantage of eutectics. An illustrative listing of useful salts and salt mixtures follows:

|      |         | ° C Melting Point |
|------|---------|-------------------|
| KCl  | - BaCl₂ | 345 |
| "    | - CdCl₂ | 380 |
| "    | - PbCl₂ | 411 |
| LiCl | - PbCl₂ | 410 |
| "    | - SrCl₂ | 475 |
| NaCl | - CdCl₂ | 397 |
| "    | - CoCl₂ | 365 |
| "    | - PbCl₂ | 415 |
| BaCl₂| - BeCl₂ | 390 |
| "    | - CdCl₂ | 450 |
| CdCl₂| - PbCl₂ | 387 |
| ZnCl₂| - SnCl₂ | 180 |
| "    | - SrCl₂ | 480 |

-continued

| | | °C Melting Point |
|---|---|---|
| $MgCl_2$ | - $PbCl_2$ | 460 |
| $PbCl_2$ | - $BeCl_2$ | 300 |
| " | - $BiCl_3$ | 205 |
| " | - $CaCl_2$ | 460 |
| " | - $CdCl_2$ | 387 |
| " | - $CuCl$ | 285 |
| " | - $FeCl_2$ | 185 |
| " | - $MnCl_2$ | 405 |
| " | - $PbI_2$ | 310 |
| " | - $SnCl_2$ | 410 |
| " | - $TiCl_4$ | 390 |
| " | - $ZnCl_2$ | 340 |
| $KBr$ | - $LiBr$ | 310 |
| I | - $CdBr_2$ | 325 |
| " | - $MgBr_2$ | 350 |
| $NaBr$ | - $CdBr_2$ | 370 |
| " | - $MgBr_2$ | 425 |
| $PbBr_2$ | - $BiBr_3$ | 200 |
| " | - $CdBr_2$ | 344 |
| " | - $HgBr_2$ | 208 |
| " | - $PbCl_2$ | 425 |
| " | - $PbF_2$ | 350 |
| " | - $PbI$ | 282 |

It will be observed that typical salts are halides e.g. fluorides, chlorides, iodides and bromides of alkali, alkaline earth, Group II, Group IV, Group V, Group VII and Group VIII metals particularly potassium, lithium, sodium, beryllium, barium, cadmium, zinc, calcium, lead, strontium, cobalt, bismuth, tin, copper, iron, titanium, manganese, mercury, and magnesium. Additionally, the hydroxides and carbonates of alkali metals, being precursors of their salts, may be used, alone or in admixture with the aforementioned salts or others having appropriate melting points.

SALT MATRIX

Essential to the present process is the dissolution of the carbonaceous fuel reactant in molten salt. In general more than 2X and up to 100X as much salt as fuel reactant is employed, i.e. far beyond normally considered "catalytic" amounts. For the purpose of this disclosure a "solution" is a dispersion of the fuel reactant solute in the molten salt solvent to a degree that provides optical uniformity e.g. less than 600 nanometers and preferably the largest aggregates are less than 300 nanometers in diameter. In the solvent-solute systems of the process reaction proceeds on the molecular level, by attack of the oxidizer gas on dispersed fuel reactant molecules, unlike certain prior known processes where the fuel reactant is particulate. Thus combustion rate is highly dependent on specific surface. In a solution or homogeneous system the specific surface is orders of magnitude greater than in conventional heterogeneous systems i.e. particulate suspensions and reaction rate is therein limited to the particle surface reaction rate.

As a matrix for the combustion of carbonaceous fuel reactant, the molten salt affords these advantages over the conventional fuel-air burner: First the salt retains both the ash and the sulfur normally generated during the combustion process. That is, the ash is not carried out of the reactor by the exhaust gases, eliminating a major source of air pollution and a cause of extra-ordinary expense in power plant construction. The sulfur may be separated by e.g. CaO or other reactant, without atmospheric exposure. Secondly, as noted above the salt has a catalytic effect on the overall combustion reaction catalyzing the combustion to completeness and efficiently to reduce to negligibility the smoke and carbon monoxide generation otherwise associated with combustion of such fuel reactants. Thirdly, also as noted earlier herein, the reaction temperatures of not generally above 1000° C. (1300° K.) are highly unfavorable to formation of nitrogen oxides. This temperature of reaction is to be contrasted with the 2700° – 3500° C. temperatures for certain other fuel-air systems. Fourthly, the bulk, i.e. over 50 percent of the heat of combustion reaction, is retained directly in the latent heat of the molten salt matrix where it is easily used to drive a heat engine. It will be recalled that molten salt has typically 500 to 1000X the volumetric heat capacity of combustion exhaust gases at 1 atmosphere pressure. More specifically, the instant molten salt systems have specific heats of about 0.2 cal./gram/°C. Typical exhaust gases are approximately the same in specific heat. However, molten salts have a density more than $10^3$ times that of exhaust gases. Thus molten salts are by orders of magnitude, a more effective medium for transferring heat from the combustion process into a heat engine or other heat utilization device, than exhaust gases. Fifthly, as a function of the concentration of materials throughout the reaction zone, the characteristic dimension of the solution is likewise orders of magnitude smaller than is possible in the conventional fuel-air system, further enhancing the potential consumption of fuel.

In general the effect of dissolving coal fuel reactant in molten salt is to solvate the coal, swelling the coal polymer, and the cracking thereof to moieties of 250 to 25,000 molecular weight. A coal system with a mean molecular weight of 2000 has more than 100,000X the specific surface for reaction as particulate coal even as small as 0.1 mm. mean diameter. Coal oxidation rates in molten salt suspension may be assumed to vary in proportion to specific surface raised to the ⅔ power, and thus the importance of obtaining solutions reaction, as taught herein, is manifest.

HEATER REACTOR — DESIGN PARAMETERS

Specific apparatus has been devised and is described herein for the heater reactor, but it may be observed in general that in these and like character reactors contemplated by the invention, the design parameters are (1) a controlled path of travel of fuel - molten salt solution mixture through the oxidizer gas stream (2) extremely brief contact times e.g. residence of dwell times (defined as reactor chamber volume divided by reaction mass flow rate through the reactor chamber) on the order typically of 0.5 to 2.0 seconds; (3) extensive interdispersion of fuel reactant and salt; (4) maximization of extraction of heat of combustion from the exhaust gases; (5) minimization of heat flux emanations from the reactor to the structural supports of the reactor; (6) provision of sufficient air-oxygen for stoichiometric conversion of C to $CO_2$. Thus one kilogram of fuel reactant-molten salt solution containing 5% by weight carbon is provided with 0.66 kilograms of air to realize the stoichiometric ratio. Further one liter of fuel reactant-molten salt solution is provided with approximately one cubic meter of air at standard conditions.

It has been found that the foregoing ratios and other design considerations are best realized by spraying the fuel reactant-molten salt solutions countercurrently through a flowing stream of the air. The bulk of the heat release, from combustion, occurs some distance downstream of the inlet point of the molten salt solution, in general in the last 20% or so of the solution travel path through the reactor. This means that the "exhaust gases" i.e. those gases containing substantial quantities of heat from the last stages of reaction must traverse about 80% of the reactor travel path before exiting the reactor and these gases are in contact with the incoming molten salt solution all the while. Thus, the generated product gases have their heat reduced by the incoming salt solution droplets in coursing through the 80% of the reactor travel path. The combustion heat is thus kept in the reactor, and put into the salt, for recovery and use as will be explained.

A further heat management feature of the process is realized by jacketing the reactor and passing the incoming air feed over the reactor to acquire reactor emanated heat, for return to the reactor and precondition the air for more efficient combustion.

In somewhat greater detail, the disclosed reactor designs optimize the sensible heat increase in the molten-salt matrix as the fuel reactant is oxidized, while simultaneously extracting as much heat as possible from the produced gases. The purpose of these reaction designs, therefore, is to maximize $\Delta H$ (of input salt solution to output salt) while minimizing $\Delta H$ (of input gas to output gases). While the indicated reaction may be carried out in a simple "pot" type reactor with air being blown through a coalesced liquid molten salt solution, such a system is convenient to use where a high volume of air per unit volume of molten salt is desired e.g. a ratio of 1000× air at standard conditions relative to salt containing about 5% fuel. Flow rates of less than about 1% reaction per second are required in a typical pot reactor to prevent simply blowing the salt out of the reactor.

Accordingly, it is preferred in the present system to disperse the molten salt-fuel reactant solution into a multiplicity of droplets and to spray the droplets through an air stream. Typically and in one embodiment hereof the salt solution is sprayed downwardly through an updraft of air or other oxidizer gas. The spray may be formed by impinging angularly directed and colliding jets of solution, by use of swirl cones of shower-head type nozzles or like apparatus and techniques for breaking a stream into droplets. Stream break-up by whatever suitable method will provide a relatively fine spray dispersed into the oxidizer gas stream.

Considering the nature of the solution spray, the spray droplets will have an initial spatial coordinate velocity from the momentum imparted from the vector components of the velocity of the injection streams. Any individual spray particle has a relative velocity to the gas stream which is the vector sum of the particle trajectory velocity and the gas stream drag forces. Each of the different spray developing techniques mentioned above has its own characteristic pattern of break-up with defined beginning and final break-up points, and a defined statistical distribution of spray droplet diameters. The mean droplet size and distribution for impinging "fans" are computable through known formulae as is the mass median droplet size for "shower-head" nozzle break-up by aerodynamic interaction.

Once the individual droplet is formed the process focuses on the utilization of three intersecting transport phenomena:

1. Momentum Transfer

As the droplet falls in the countercurrent air flow, the drag will slow the droplet. Conventionally, droplets have been treated as spheres wherein the "drag force" has been equated to the droplet mass times its acceleration to derive a drag factor $C_D$. Values for $C_D$ versus Reynolds Number have been extensively measured and compare approximately as follows, in the range of interest:

| Reynolds Number (Re) | $C_D$ |
|---|---|
| 0.5<Re<70 | 27 Re $^{-0.84}$ |
| 70<Re<59,200 | 0.414 Re $^{0.143}$ |
| 59,200<Re | 2.0 |

The trajectories of the droplets of different size classes may be calculated. The initial drop velocity and the countercurrent gas velocities are designated so that the fall vector of the droplet with a radius representing the 90th weight percentile will read zero vertical velocity at a height between 80 and 100% of the fall distance. After this point, the droplets will start to reascend until colliding and coalescing with other drops, falling thereinto. This slowing of the other drops fall and recirculation of the drops occurs most extensively in the lower 10% of the reactor chamber length. The spray mass, thereby, will spend over half of its total fall time slowing and recirculating in the lower end of the reactor chamber.

2. Mass Transfer

In order to carry out the combustion or more properly the oxidation of the dissolved fuel reactant, oxygen from the air must dissolve in the molten salt-fuel solution and the fuel and oxygen codiffuse into reaction proximity. If the intradrop diffusion processes (inside the droplet) are much faster than the transdrop diffusion (through the gas boundary layer), the reaction rate may be treated as gas boundary layer limited. On the other hand, if the diffusion processes through the gas boundary layer are much faster than the intra-drop diffusion, then intra-drop diffusion will be the limiting rate. If both transdrop and intradrop diffusion processes are of the same order, both processes must be considered in evaluating the reaction rate. Assuming an analogy between diffusion and heat transfer for highly fluid droplets, it has been shown elsewhere that for the assumed sphere, size and time regime, the distribution of heat is nearly uniform through the sphere. Further assuming the mentioned similitude between the heat transfer and diffusion in a fluid drop, the reaction rate in oxidizing the fuel in the droplet is determined by the diffusion rate of oxygen through the gas side boundary layer to the droplet. Existing mass transfer correlation thus permits the estimation of oxygen influx, the combustion rate, and $CO_2$ efflux to and from the droplets.

3. Heat Transfer

As noted, the oxidative process occurs within the droplet of the molten salt-fuel reactant solution. Thus the droplet is the site of heat accrual. The droplets will exchange heat with the surrounding gas environment by these processes:

a. The largely carbonaceous fuel will react with the oxygen to yield $CO_2$ on an approximately 1:1 basis. the $CO_2$ will have the droplet at the instant drop temperature while $O_2$ influx arrives at ambient (for the reactor) temperature. The effect is a net increase in the reactor gas temperature;

b. Forced convection heat flux will have two effects. First the heat flux will heat up the incoming gas flow at the bottom (inlet) of the chamber where, as mentioned, the bulk of the oxidative reaction has occured, to heat up the droplets. Secondly, the heat flux will cool the heated, oxygen depleted exhaust gas flowing upward through the yet-to-react droplets in the upper 80% or so of the reactor chamber.

The heat flow due to the exchange of local gas ambient temperature $O_2$ for droplet temperature $CO_2$ can be estimated from diffusion correlations and the correlation for forced convection heat flux from other equations to permit a computation of heat flow values for the process.

There is disclosed herein apparatus executing the principles just enunciated and designed to obtain high rates of energy release from the air-oxidation of molten salt-carbonaceous fuel reactant solutions. Specifically apparatus herein described enables hot exhaust gases produced adjacent the salt outlet- and air inlet-area of the reactor to exchange heat and momentum with the counterflowing droplet field, reducing the droplet speed to near zero-relative to any fixed point in the chamber, and reducing the exhaust gas temperature to near that of the molten salt fuel reactant solution inlet temperature (400° – 600° C.).

Treating now with more specificity the jacketing concepts for the reactor which enable use of low cost steels for support work at the reactor, the apparatus reactor chamber may be double-walled or enclosed by tubular members to surround or "jacket" the reactor per se. The jacket (be it a walled chamber or a plurality of tubes) is filled with moving fluid at a temperature above the melting point of the molten salt but below the reactor chamber reaction mass temperatures. This jacket fluid in certain embodiments is the molten salt itself, e.g. at reactor chamber inlet temperatures (below 600° C.) or in other embodiments a metallic liquid, molten lead or high temperature organic heat exchange mediums such as diphenyl oxide. Beyond the jacket just described there is provided a second double wall or tubular layer through which air feed is flowed at temperatures approximately 280° C. Thus the structural members supporting the reactor chamber and containing the pressure load thereof being exterior of the jackets are not subjected to thermal loads much beyond 250° C., despite the reactor chamber interior reaching temperatures of nearly 1000° C.

HEAT EXCHANGER DESIGN PARAMETERS

It is a signal feature of the present process that heat management techniques have been developed and are presented here which complement the innovative combination reactor and process and enable the obtaining of the full benefits of this technology. As will be noted from the discussion of the combustion reactor, the purpose there is to obtain as much heat as possible and to get as much heat obtained as can be into the salt. The present portion of this disclosure is concerned primarily with getting utility from the heat in the salt.

Several criteria have been developed for establishing heat exchanger design including:

1. Direct contact heat exchange between fluids of different temperature.
2. Use of mutually immiscible fluid pairs, each with good Δp.
3. Use of jacketed apparatus.
4. Avoidance of cross contamination between the heat producing fluid (salt) and the heat using fluid (steam).

In general the heat exchange is accomplished by using a two-phase differential flow, high dispersion, high relative velocity fluid-fluid, direct contact heat exchanger system. Among the several advantages of direct contact heat exchangers over indirect heat exchangers are:

a. From one to four orders of magnitude greater specific surface;

b. From one to four orders of magnitude shorter mean molecular paths from any point in the heat exchange fluid to an exchange surface c. Absence of separating walls which reduce heat flux.

As in the reactor designs above noted, heat exchange construction with jacketing permits the components of the vessel structure which bear the design stresses to function at a temperature substantially below the temperatures of the exchanger fluid content. The result of these combined design features is a heat exchange system adapted to be interposed between a heat source and a heat consumer of heat engine such as a steam turbine and by its design the heat exchange system is orders of magnitude smaller than a conventional steam plant boiler system of comparable output rating and being smaller it consumes fewer materials in its construction and costs less.

PRINCIPLES OF HEAT EXCHANGERS

The majority of heat exchangers have fixed surfaces over or through which a fluid moves to add or remove heat. Frequently the solid surfaces are walls which separate two moving fluids and confine them along a predetermined path while a heat flux occurs between them. Direct contact heat exchangers are known e.g. evaporative coolers which commingle fluids but in these the fluids are exhausted and continually replaced.

In a conventional heat exchanger of the confined path type, volumetric specific heat flow is severly constrained by the practicalities of construction geometry which limit the surface area which is available for heat transfer operations. And the less surface area, the lower rate of heat transfer other factors being equal, and the larger the heat exchanger needs to be to accomplish the transfer of a given quantum of heat in a given period of time.

RECOVERABLE FLUIDS HEAT TRANSFER

In contrast to surface indirect heat exchangers and heat exchangers of the evaporative cooling type, the present process utilizes fluid which are intimately mixed to effect heat transfer, but which being inherently immiscible, are recoverable and indefinitely reuseable. Importantly the heat transfer medium is highly dispersible to maximize heat transfer surface, but also readily recoalesced for ease of manipulation through the process. Thus the heat exchangers of the invention employ heat flux preferably between two immiscible, separable liquids, in general including a differential passage of one liquid past the other, e.g. the heavier liquid downward, the lighter liquid upward, with intimate interdispersion between the respective liquid inlets and outlets. There is subsequently described herein specific apparatus for the purpose, but at this point it may be observed that such apparatus lends itself to incorporation in a high volume, high efficiency power plant such as that described herein deriving high heat energies from combustion of certain fuels dissolved in molten salt, using the high heat content salt as one of the heat transfer fluids.

Therefore the present invention avoids the limitations of indirect contact heat exchangers, specifically by eliminating the walls which define separate fluid flow paths, and which as well limit heat conduction and restrict the surface area available for heat transfer. Further said prior art heat exchangers provide heat transfer between fluids only at the wall-interface which is by nature far from the bulk of the fluids in order to permit adequate flow rates. Only evaporative spray coolers and certain rocket motors have achieved the near ultimate in high volume specific phenomena rates, and because these systems tolerate an ultimate commingling of the fluids; but the fluids are nonrecoverable, and such systems have not been adapted to power plant heat transfer applications where fluid recycle is economically essential or where fluid contamination is intolerable, such as steam fluid for turbines.

As will be described hereinafter in greater detail, there is provided herein a novel construction of a heat exchange system in which a pair of heat exchangers are used, and coupled together in the heat transfer and physical sense by a nonmiscible, inert heat transfer fluid specifically in most preferred embodiments, liquid, molten lead. The use of this intermediate heat transfer medium enables utilization of a direct contact fluid-fluid heat exchange with all its attendant benefits, and withal avoids cross-contamination of the fluids. This heat is taken from the molten salt into the heat transfer medium and transferred from the heat transfer medium into steam, without the salt contacting the steam. As will be evident this technique of heat transfer permits use of system designs utilizing very high specific contact surfaces (molten lead distributed in molten salt and molten lead distributed in steam) and very high flow Reynolds numbers to thereby yield high efficiency designs for the transfer of heat from molten salt to steam to drive heat engines, such as turbines.

Specifically the present apparatus and process comprise a direct contact fluid-fluid heat exchange system using high dispersion contact, and mutual immiscibiiity and density differences to effect a clean separation of the fluid into separate effluxing streams. In a vertical apparatus, the higher density fluid is introduced at the upper end of the heat exchanger chamber e.g. injected thereinto the flow in a highly disperesed, high shear manner downward through the chamber. This heavier phase falls in its dispersed condition until collected at the interface of the dispersed droplets and the coalesced mass of droplets, at or near the bottom of the chamber. The heavier phase is a continuous phase at the chamber bottom and may be recycled and redispersed. The lighter density fluid is introduced into the same heat exchanger chamber at the lower end thereof e.g. injected to pass upwardly in a highly dispersed, high shear flow relation through the continuous phase portion of the heavier fluid to the mentioned interface of the heavier fluid dispersed and continuous phases, through that interface, whereupon the lighter, upwardly moving phase itself coalesces from its initial dispersion and becomes the continuous phase through which the heavier phase moves dispersed. In a vertical chamber embodiment, the force of gravity is used to effect relative movement of the heavier and lighter phases, facilitated by preferably large differences in density of the fluids being passed differentially through the chamber. It will be apparent that movement of the two phases in the same direction, but at different speeds will also effect the differential passage of fluids. In certain embodiments, the separation of phases may be accelerated or clean-up of phases made more complete, particularly where fluid density differences are smaller, by passing the respective effluents through e.g. cyclone separators as a supplemental step.

In other embodiments, the heat exchanger chamber may be essentially horizontal and disc-shaped or "discoid." In these embodimetns the differential fluid passage is enhanced by centrifugal forces and gravity forces are essentially neglected. Centrifugal forces are realized by an induced rotary movement of the two fluids. Typically the lower density fluid is injected near the outer collecting volute rim for the higher density fluid and passed centripetally inward, while the higher density fluid which has been introduced radially adjacent an axially located discharge port for the lighter phase is passed centrifugally outward. In the embodiment, the two fluids rotate in the same direction; the centrifugally induced $g$ field forces a countercurrent i.e. cross-current flow, of the lower density fluid inward to the axis and the higher density fluid radialy outward toward the chamber periphery. As in the vertical embodiment, the respective fluids are first dispersed in a continuous phase of the other and they coalesced for recovery and to define the continuous phase to receive the dispersed phase adjacent each fluid inlet.

Accordingly there is provided herein a method and apparatus for direct contact heat exchange. Specifically there is provided a method for heat exchange between a relatively higher density liquid and a relatively lower density liquid immiscible therewith and having different heat contents, which includes differentially passing a dispersed phase of each liquid through a continuous phase of the other liquid in a heat exchange zone, and coalescing the dispersed phase liquids so passed to define the continuous phase of that liquid. The method further includes initially dispersing the first liquid in the continuous phase of the second liquid and subsequently the second liquid in the continuous phase of the first liquid, and subjecting the liquids to a force differentially urging the dispersed phases past one another and into self-coalescing proximity beyond the continuous phase of the liquid in which the dispersed phase was initially dispersed. In practice of the method, the coalescence of the higher density liquid continuous phase displaces the lower density liquid contiuous phase within the heat exchange zone. That is, when the heat exchange zone is vertically extended and the urging force is therefore gravity, the lower density liquid continuous phase is displaced upwardly, whereas in a circular zone where the force is centrifugal the lower density liquid is displaced centripetally. In apparatus terms there is provided for direct contact heat exchange, a chamber having means to pass relatively immiscible, different heat content different density liquids differentially in direct contact through the chamber and means to recover each of the liquids separately, in continuous phase and substantially free of the other liquid. The chamber may further be provided with inlet means adjacent the outlets for each continuous phase liquid to introduce the other liquid in dispersed phase relation into the continuous phase. Where the chamber is vertically elongated, the inlet for the lower density liquid will be at the bottom and the outlet therefor at the top of the chamber, the inlet for the relatively higher density liquid conversely being at the top and its outlet at the bottom of the chamber. Where the chamber is discoid, the chamber has a peripheral inlet for the relatively lower density liquid and central outlet therefor, and conversely, a central inlet for the relatively higher density liquid and a peripheral outlet therefor.

DESPERSION ASPECTS

As noted the two fluids are dispersed into continuous phases of one another and then collected as a continuous phase subsequently. The technique of dispersion of the phases may involve one or both of injection and stream break-up by impingement of angularly directed colliding streams which "fan" into droplets, or use of injection nozzles of appropriate design e.g. "shower head" injectors. Whatever the mode of break-up of the fluid streams into droplets and upon calculation of the mean drop size from available formulae for similar systems the droplet trajectories may be estimated, initially from the injection vectors and more specifically from consideration of drag and momentum transfers including incremental transfers of momentum, residual momentum and the continuingly exerted forces i.e. gravity in the vertical chamber or column and centrifugal forces in the discoid chamber. The momentum change in the discontinuous phase is estimated from the "drag relations," plus the effects of gravity loading or centrifugal loading in these respective, affected chambers.

HEAT TRANSFER ASPECTS

Heat Transfer between the droplets of the discontinuous phase and the surrounding continuous phase occurs under "forced convection" conditions, estimable from known correlations of heat flux transfer to spherical droplets. The result of droplet forced convection, heat flux transfer relative to conventional heat exchange system is that the presently disclosed heat exchangers, have:

1. Orders of magnitude greater specific surface for the heat flux fluids; and
2. Orders of magnitude shorter heat flow paths from any given point in the heat exchange fluid to a heat exchange interface of discontinuous phase droplet and continuous phase matrix.

JACKETED APPARATUS

In the reactor construction design, the heat exchangers of the invention are double-walled, tube lined or otherwise jacketed to have an inner shell containing the high temperature fluids (up to 1000° C) with a negligible $\Delta p$ across the shell, and withal a support or load carrying structure which can function at hot side temperatures less than 200° C. Thus the heat exchangers herein are substantially reduced in weight, size and materials cost and can operate at relatively higher pressures and/or temperatures for a given set of construction materials.

HEAT EXCHANGE MEDIUM

The several criteria for the heat exchange medium include (1) fluidity in the temperature range of interest, (2) inertness to construction materials, and relative to the heat transferring fluid: (3) immiscibility; (4) substantial differences in vapor pressure at the several operating temperatures encountered; and (5) relatively different densities, particularly where separation is being effected by gravity or centrifugal field forces.

Among the materials which may be mentioned for use as the heat transfer medium, relative to the other fluids being processed are highly reactive metals such as sodium, lithium and potassium which may be heat exchanged with saturated hydrocarbons in thermally stable regimes; somewhat reactive metals exchanged with nonreactive molten salts; water which may be exchanged with various nonreactive liquids; low reactivity gases for heat exchange with other low volatility, low reactivity liquid; and in a preferred group low reactivity low melting metals, particularly lead, bismuth, tin and their alloy systems, which may be heat exchanged with water (steam) fluorocarbons, nonreacting molten salts, numerous organic heat exchange liquids such as diphenyl oxide, and silicone oils.

In general for a given system of molten salt containing heat to be transferred to steam, it is preferred to employ a different density, high specific heat, immiscible liquid and particularly a metal and more especially lead or other high density, high specific heat, low melting, inert, nonreactive elemental or alloy metallic material such as tin or bismuth and particularly the lead alloys of these two metals.

DETAILED PROCESS AND APPARATUS DESCRIPTIONS

With reference now to the accompanying drawings, in FIG. 1 an overview of the several operations is provided. Air as a typical oxidizer gas is introduced into the process with preheating and precompression as will be seen (FIG. 2) along line 10 to combustion reactor 12. To the same reactor 12 is introduced along line 14 a molten salt solution of fuel reactant, typically a coal residuum, or devolatilized coal product. The fuel reactant is oxidized by the air fed into combustion reactor 12 and there is obtained exhaust gases of the combustion and molten salt now substantially coal free but containing mineral materials herein collectively referred to as "ash." The salt is passed along line 16 for process use and ultimately venting to the atmosphere (line 48 in FIG. 2), and the ash being separated therefrom along line 20 e.g. by apparatus hereinafter described with reference to FIGS. 6 and 7. Specific embodiments of the combustion reactor 12 are shown in FIGS. 3, 4, and 5. Following separation from reactor 12 through line 16 the salt carrying most of the sensible heat of combustion is heat exchanged to produce steam by a series of heat transfer operations illustrated in zone 22, from salt, to liquid metal, to steam and recycled through line 23. Additionally, the liquid metal heat is used for air preheating along line 24 and the steam is cycled to steam consumer operations such as a power turbine (not shown) along line 26. Exhaust gases are removed via line 18.

With reference now to FIG. 2, a schematic flow sheet of the process is set forth. The fuel reactant feed is introduced at 14. The nature and composition of the molten salt solution of the several useful fuel reactants has been discussed in detail above. The molten salt solution feed in line 14 is typically at a temperature between about 850° and 1100° C and preferably 900° and 1000° C and at a pressure of between about 1 and 15 atmospheres, the specific pressure varying somewhat with the particular pressure conditions within the reactor 12, and the mode of delivery intended to be used in the reactor e.g. the type nozzles 27. In the FIG.

2 embodiment, the reactor 12 is a vertically extended cylinder 28 operated nearly hydraulically full with a head space 30 at the top of the cylinder, and a liquid level 32 just above the point of introduction of feed solution to the reactor so that the feed solution is introduced from line 14 submerged. Hot gases are exhausted from the reactor head space 30 overhead through line 34 to successive heat exchange stages 36, 38 to derive the maximum benefit from the heat content of these gases, which heat content, is will be recalled, is generally less than half the heat of combustion and preferably far less, the vast bulk of the heat having been transferred to the salt 40 within reactor 12. Nonetheless, the exhaust gases in line 34 do contain useful amounts of heat. It needs to be recalled here that these exhaust gases do not require precipitators or like fly ash removal treatments, or even sulfur compound recovery operations, since these atmospheric contaminants are trapped within the salt matrix 40 in the reactor 12 for subsequent separation without ever becoming airborne.

The exhaust gases in line 34 are typically at a temperature between 400° and 500° C and a pressure between about 1 and 15 atmospheres. These exhaust gases are passed through heat exchanger 36 for transfer of gas heat to incoming air feed to the reactor in line 10. From heat exchanger 36, the somewhat cooled, but still hot exhaust gases are passed along line 42 to an expansion motor, shown as turbo-expander 44, the hot gases being fed into the expansion horn at 45, expanded therein e.g. to a pressure of about 1 to 2 atmospheres and simultaneously cooled to a temperature between about 150° and 200° C and passed therefrom along line 46 to the further heat exchange stage 38 after which heat transfer, the exhaust gases are vented to the atmosphere through line 48.

Incoming air as the oxidizing gas is both heated and compressed in advance of the reactor 12, using the exhaust gases. Thus air introduced into the system in line 10 is passed into the compressor stages 50 of the turbo-expander. That is turbo-compressor 50 is operatively coupled to the expansion motor 44 as shown by dashed line 52 whereby the energy derived from the exhaust gas expansion is used to drive the compressor turbine. The air in line 10 is generally heated to between about 250° and 350° C by this step and elevated in pressure from one atmosphere to between about 2 and 15 atmospheres. Following its compression and attendant heating in turbo-compressor 50, air in line 10 is heat exchanged with the exiting exhaust gases in heat exchanger 38 and heat exchanger 36 which define progressively higher temperature zones to increase the temperature of the incoming air in line 10 leading to the reactor 12 between about 275° and 375° C. The air, at a pressure of about 2 to 15 atmospheres then is introduced into the molten salt solution through a series of submerged inlets, nozzles 27, which distributively pass the air into the salt solution. Reaction ensues between the heated, precompressed air and the molten salt solution of fuel reactant. The exhaust gases are collected and employed as just described.

It will be observed that the flow of salt solution and air through the reactor has been countercurrent, and too this flow is very rapid, providing quite limited residence times within the reactor 12 of on the order of 0.2 to 2 seconds. The relative quantities of reactants are such that complete combustion of the fuel reactant is effected, and generally in the ranges noted earlier in the description or higher or lower for particular reactor, reactant and reaction situations.

The molten salt following removal therefrom by combustion of the fuel reactant and the concomitant generation of ash is passed out of the reactor 12 along line 16.

The molten salt in line 16 is generally at a temperature between 850+ ad 1100° C and a pressure of 2 to 10 atmospheres. The molten salt is passed through the ash separator 54 to be described, where ash is mechanically removed and separated through line 56. The molten salt still carrying its burden of combustion heat is passed to the heat transfer stages of the process. It may be desirable at this point to increase the pressure on the molten salt to accommodate the pressure relationships of the heat exchangers to follow. This may be accomplished along line 58 with state of the art booster pumps (not shown) including such pumps driven by a pressure drop taken on process fluids from elsewhere in the process.

It is generally desirable where steam is to be the ultimate end product of the process, to have the pressure of molten salt in line 58 between 10 and 50 atmospheres for commencing heat transfer operations. This enables a pressure drop through the heat transfer steps while still obtaining heat transfer to steam at useful pressures for operating a generator turbine.

The molten salt in line 58 at a pressure between about 10 and 50 atmospheres and a temperature between 850° and 1100° C is passed through direct contact heat exchanger 60 (to be described in detail hereinafter) and exits the heat exchanger through line 64 at a pressure of about 5 to 45 atmospheres and a temperature between about 425° and 475° C. The molten salt may be recycled along line 64 e.g. to the reactor 12 with a fresh charge of fuel reactant, as the solution feed.

Within the heat exchanger 60, typically and illustratively, a liquid metal introduced at a temperature of 350° to 400° C and a pressure of 10 to 50 atmospheres from line 66 acquires heat by direct contact heat exchange from the salt, to exit the heat exchanger at 800° to 1000° C and a pressure of 5 to 45 atmospheres. Thus heated, liquid metal, free of salt, is passed along line 68 which together with line 66 comprises a closed liquid metal loop, to a further direct contact heat exchanger 70 wherein steam is heated by direct contact with the liquid metal. Following heat transfer in heat exchanger 70 the liquid metal is returned to salt heat exchanger 60 for reheating, along line 66 of the liquid metal loop. The steam from heat exchanger 70 is passed along line 72 to a turbo-generator 74 e.g. a conventional steam driven turbine generator for the generation of electricity, and thence returned for reheating to the liquid metal heat exchanger 70 through line 76, the lines 72 and 76 defining a steam loop. In general, the steam being introduced into the liquid metal heat exchanger is at 50 to 200 atmospheres pressure and 100° to 150° C temperature, while the metal exchange heated steam in line 72 is typically at 650° to 800° C and 45 to 190 atmospheres.

VERTICAL REACTOR DESCRIPTION

In FIG. 2 a vertical reactor 12 operated hydraulically full of molten salt is illustrated. In FIG. 5, a preferred form of vertical reactor 121 is depicted, one providing for the suspension of fuel reactant-salt solution in an updraft of air or other oxidizing gas for the required times to completely oxidize the fuel reactant. Additionally, numerous heat management features are integrated into the FIG. 5 reactor design. With reference then to FIG. 5, the reactor 121 comprises a reactor chamber 80 defined by vertically extended cylindrical wall 82 having central openings 84 at the top and 86 at the bottom thereof for an exhaust gas outlet pipe 88 and a molten salt outlet pipe 90 respectively. The wall 82 is generally enclosed by a first jacket structure comprising coaxial cylindrical wall 92 defining with reactor chamber wall 82 an inner annulus 94. The reactor chamber 80 and the inner annulus 94, in turn, are enclosed by a second jacket structure comprising the cylindrical coaxial wall 96. Wall 96 defines with the first jacket wall 92 an outer annulus 98. An inlet port 100 extends through the upper portion of the wall 96 of outer annulus 98 for introduction of fluid into the inner annulus 94. The inner annulus 94 terminates in an outlet 102 coaxial with molten salt outlet pipe 90.

A series of circularly spaced injector ports 104 is provided about the lower reaches 106 of the reactor chamber 80, communicating the lower chamber interior 106 with the outer annulus 98. An annular, downwardly extending baffle 108 surrounds the lower reaches 106 of the chamber 80, ensuring passage of fluid in the outer annulus 98 all along the length of the first jacket wall 92 prior to entry through injector ports 104. There is additionally provided a salt-fuel reactant solution distributor 110 at the upper end of the reactor chamber 80. Typically the solution distributor 110 will include an array of downwardly directed nozzles 112 supplied molten salt solution with fresh fuel reactant dissolved therein from inlet line 114.

The vertical reactor 121 is operated by introducing a 5 to 20 percent solution of e.g. coal in molten salt at a temperature of 400° C and a pressure of 10 atmospheres through nozzles 112 in a downwardly directed free-falling spray 116. Air or other oxidizing gas is passed from line 118 through annulus 98 along the length of the reactor 121, increasing in temperature by indirect absorption of heat emanating from the reactor chamber 82 (and simultaneously protecting reactor chamber support structure, not shown, from undue heat exposure) to be at a temperature of 250° C and a pressure of 10 atmospheres at the injector ports 104. The introduced gas 122 generates an upward draft which carries the falling molten salt droplets dancingly up and down in the reactor chamber 80, generally at the lower 20 percent of its length e.g. at 108, as heretofore described, until the coal therein is consumed and the salt droplets agglomerate and coalesce sufficiently to fall through the gas updraft. Coalesced droplets are collected in a pool 120 in receptacle 124 for separation from the reactor chamber 80 through pipe 90.

The liquid metal, or like heat exchange medium, used elsewhere in the process for direct heat transfer is employed in the FIG. 5 reactor design as an indirect heat transfer medium. Liquid metal, such as lead, is passed through inner annulus 94 between the reactor wall 82 and the gas in outer annulus 98, to simultaneously limit heat emanation from the reactor chamber 80 to surrounding structure, to preheat the oxidizer gas feed from line 118 and/or to heat the liquid metal for other operations.

Exhaust gases produced are taken from the chamber 80 through pipe 88 for handling as earlier described in connection with FIG. 2.

DISCOID REACTOR DESCRIPTION

Alternative to the vertical reactor of FIGS. 2 and 5 is the discoid reactor 221 shown in FIGS. 3 and 4. The discoid reactor 221 partakes of the same principles of differential flow of oxidizer gas and molten salt solution, and multiple jacketing of the reactor as are found in the FIG. 5, reactor 121 embodiment. Thus, with reference to FIGS. 3 and 4, discoid reactor 221 comprises a generally cylindrical horizontally extended chamber 200 defined by a radially tapered wall 202 having an axial passage 204 extending upwardly therefrom. The discoid chamber wall 202 is generally enclosed by a congruent wall 206 which together with the chamber wall defines inner interwall space 208. Beyond wall 206 is a further wall member 210 which also is generally congruent with the chamber wall 202 and which with wall 206 defines an outer interwall space 212. The inner interwall space 208 defines a flow space for liquid metal or other heat transfer fluid being used elsewhere in the process and which is passed along the chamber wall 202 between inlet port 214 adjacent the chamber axis 215, and outlet pipe 216 at the perimetrical extremity of the reactor chamber 200. Air, or other oxidizing gas, is furnished to the discoid chamber 200 through a series of relatively circularly spaced injector ports 218 which communicate the interior of chamber 200 with the outer interwall space 212 into which air or other gas is introduced through inlet 220. For purposes to appear the injector ports 218 are canted relative to the median horizontal plane of the chamber 200. As in the vertical reactor 121 the discoid reactor 221 is provided with a baffle 222 to ensure full passage of the feed air along the entire extent of the reactor chamber wall 206.

In the discoid reactor embodiment of FIGS. 3 and 4, the molten salt-fuel reactant solution may be introduced by a series of nozzles and preferably is introduced through inlet 217 at nearly the axis 215 of the reactor chamber 200 and in a series of angularly directed, colliding, jets or streams 219 which, upon impingement, fan into a multiplicity of droplets to ensure break-up of the solution into readily treated, discrete portions. For this purpose the discoid chamber 200 is provided with a series of opposed pairs of angularly related jet nozzles 224 fed by upper and lower plenums 226 to generate a fan of the dropletized streams 223. The nozzle 224 like the air ports 218 are canted relative to the median horizontal plane of the reactor chamber 200, for purposes now to be explained.

The relationship of the several fluid streams is highly important. Initially, it will be observed that differential, counter-flow is realized by introducing the molten salt fuel reactant solution circularly and adjacent of the chamber axis 215 through canted nozzles 224 which direct the solution circularly into the chamber 200 i.e. tangent to a line parallel to the chamber periphery 230 and salt is taken out at the chamber periphery through pipe 232. Air, as the oxidizing gas, is introduced at nearly the periphery 230 of the chamber 200 and exhaust gases are taken off at the axis 215 of the chamber 200. Thus, these two fluids pass through one another. The air, before being introduced into the reactor chamber 200 is passed radially outward through outer interwall space 212 to absorb, indirectly, the heat emanated from the combustion occurring in discoid chamber 200, while liquid metal similarly is passed concurrently from nearly the chamber axis, at inlet port 214 to the periphery 230 of chamber 200 for exit through pipe 216; the liquid metal absorbing the reactor chamber heat indirectly through chamber wall 202 and transferring some of this heat indirectly to air or other oxidizer gas to be introduced into the reactor chamber 200 through injector ports 218.

The flow pattern of salt-fuel reactant droplets 223 is determined by their canted disposition and the relative location of their inlet 217 and outlet 232, and the prevailing flow direction of air or like gas in the discoid reactor chamber 200. Recalling the suspension of droplets in the vertical reactor 121, it will be clear that the gravity force on the droplets 116 there was balanced at least briefly, and in a dynamic way by the force of updraft air 122. Similarly, in the discoid reactor 221 the air force balances, briefly and dynamically, the force carrying the droplets from the point of introduction to the point of exit. For this purpose, the air injector ports 218 are canted so as to give an initially circular or more particularly, spiral, flow path to the injected air. In FIG. 3, this spiral air pattern is shown in the light dashed lines 236. Salt solution droplets entrained in the air stream, are carried therewith, but as they acquire speed, centrifugal forces come into play carrying the droplets outward along a different spiral path, a path of greater spiral pitch than the air streams 236, an illustrative path being shown by the solid line 238. As the droplet loses fuel reactant and becomes lighter, the centrifugal force is decreased relatively, but the angular velocity of the air streams at the periphery 230 of the reactor chamber 200 is less relatively than inwardly of the periphery, the result being a dynamic suspension of the droplet, for a time enabling complete combustion of the fuel reactant, and coalescence of the droplets to a mass sufficient to separate from the air stream into peripheral pool 240 for separation through outlet pipe 232.

The temperatures and pressures of the several fluids in the discoid reactor embodiment of FIGS. 3 and 4 are the same generally as these values in the vertical reactor embodiments of FIG. 6.

REMOVAL OF ASH AND OTHER SOLIDS

It has been pointed out above that mineral matter remaining after combustion of the coal or like fuel reactant which matter may be generally referred to as ash and will include all manner of solid substances including oxides and sulfides of metals including for example alkali metal sulfides produced by addition of alkali metal salts and hydroxides. With reference to FIGS. 6 and 7 an ash separator 250 is shown comprising a chamber 252 of generally circular design and centrally domed. The chamber 252 is supported on hollow post 254 which extends upward into the interior 256 of the chamber above the horizontal median level within the chamber, for purposes to appear. To one side of the chamber 252 at the median level of the chamber a barrel 258 is provided extending horizontally through the chamber to open at 260 on one side into the chamber. Barrel 258 is provided with a rotatable screw 262. Additionally an inlet 264 for delivery of ash containing molten salt (i.e. from line 16 in FIG. 2) is provided generally diametrically opposite the barrel 258 and aranged to deliver the molten salt tangentially into the chamber 252 whereby the salt assumes a circular, or more properly a spiral flow path through the chamber. The post 254 is open at the top to define a salt outlet 266 communicating with the hollow interior 268 of the post and ultimately to line 58 (FIG. 2) for flowing the ash-separated molten salt to the heat exchange stages.

In operation the spirally flowing molten salt imparts a relatively greater centrifugal moment to ash and like mineral solids suspended in the salt whereby these materials are carried to the periphery 270 of the ash separation chamber 252. Screw 262 is rotated to urge peripheral accumulations of ash and entrained salt from the chamber 252 to disposal. The molten salt is passed from the chamber 252 centrally through opening 266. Opening 266 is at a height within the chamber 252 that limits carryover of ash with the molten salt passing through the opening to provide an effective decanting of molten salt from ash accumulations and continual purging of the chamber of the ash accumulation by screw 262.

As shown, the ash separator 250 is jacketed by wall 272 so as to recover the heat of the molten salt, e.g. into liquid metal or steam to be used elsewhere in the process, by passing these fluids over the chamber 252 exterior.

In a typical instance of the process, the molten ash and salt mixture in line 16 enters separator 250 at a temperature between about 850° and 1100° C and at a pressure between about 2 and 10 atmospheres. The molten salt, now ash free leaves separator 250 with little loss of temperature or pressure.

HEAT TRANSFER TO STEAM — VERTICAL EXCHANGER

The principles of heat transfer from molten salt to a dispersed high specific heat, inert heat transfer medium and from that medium to steam have been discussed above. With reference to FIG. 8 a form of apparatus for effecting the transfer of salt heat content to a liquid metal such as molten lead is shown at 300. The apparatus 300 comprises a vertically disposed elongated chamber 302 having a wall 304 of generally cylindrical configuration and domed at the top and bottom. The chamber 302 has a molten salt inlet pipe 306 leading e.g. from line 58 (FIG. 2) and a series of laterally distributed nozzles 308 for delivering the salt into the chamber interior 310 as a discontinuous phase in molten metal for passage upward through the chamber. In general, the molten salt delivered to the chamber 302 is at a temperature between about 850 and 1100° C and a pressure of 10 to 50 atmospheres. Molten lead, as typical and illustrative of the heat transfer medium is introduced into the top of the chamber 302 through inlet pipe 312 having a series of laterally distributed nozzles 314 which rain the liquid metal downward as a discontinuous phase dispersed in molten salt continuous phase through the upwardly moving column of molten salt. The gravity differential causes the lead to fall through the rising salt to coalesce in a pool 316 in the lower reaches 318 of the chamber 302. The coalesced molten lead displaces the molten salt upward and itself is drawn off through outlet pipe 320 and passed to the steam heat exchange step e.g. through line 68 to heat exchanger 70 (FIG. 2).

The molten salt moves upwardly through the heat exchanger chamber 302 passing from a discontinuous phase in the liquid metal to a continuous phase in which the metal is discontinuous, and is drawn off through outlet pipe 322 e.g. to recycle through line 64 (FIG. 2). There subdivision and dispersion of the molten lead through the salt, or vice versa is carried out to a degree providing the most intimate form of contact for fastest heat transfer given an assumed height of chamber 302. In a typical process the lead enters the chamber interior 310 at a temperature between 350° and 400° C and a pressure between 10 and 50 atmospheres. The lead in outlet pipe 320 is typically increased in temperature to about 900° C and decreased in pressure by approximately 2 – 5 atmospheres. Conversely the molten salt, entering at temperatures and pressures given just above, in outlet pipe 322 is at a temperature about 400° C and a pressure about 10% below salt incoming pressure.

Consistent with the overall process approach of using heat most effectively, the chamber 302 is provided with surrounding jackets and insulated as well. Thus wall 324, congruent with chamber wall 304 and defining an inner annular space 326 therewith is provided. Relatively cool molten lead, e.g. at 350° C is passed along the length of chamber wall 304 in inner annular space 326 upward from inlet 328 to the inlet pipe 312 for dispersion into the chamber interior 310, accumulating additional heat in such passage and also protecting the support structures (not shown) of the chamber 302. Outward of inner annular space a further congruent wall 330 is provided spaced from wall 324 and defining therewith an outer annular space 332 which jackets the inner annular space 326 and the chamber 302. Steam or other process fluid may be passed through the outer annular space 332 from inlet 334 to outlet 336 absorbing heat indirectly emanated from the chamber 302 and through the lead in inner annular space 326, while further protecting the chamber support structure. Finally a support structure, shell 338 is provided congruent with the chamber 302 and enclosing the walls 324 and 330, spaced therefrom by an insulative layer 340.

HORIZONTAL HEAT EXCHANGER

The heat exchange between salt and lead may be effected in a horizontal heat exchanger shown at 342 in FIG. 9. Analogously to the reactor of FIG. 4, described above, the heat exchanger 342 is discoid in form and jacketed. Thus the heat exchanger 342 comprises a wall 344 supported centrally by wall 346 defining an outlet passage 348 for steam being heated indirectly by the apparatus, the wall 344 defining a heat exchange chamber 350 having a liquid metal e.g. molten lead inlet in the form of plural radially spaced apertures 351 just outward of the chamber center line 352 and communicating the chamber interior 354 with a first jacket space 356 supplied relatively cool molten lead through inlet 358. The lead is passed the length of the chamber wall 344 in advance of inlet aperture 351 and once through the chamber 350 is collected at outlet pipe 360 e.g. for passage to steam heat exchanger 70 through line 68 (FIG. 2). The lead is introduced tangentially to flow in a spiral through the heat exchanger in the manner of the salt solution in the reactor of FIGS. 3 and 4. Similarly, molten salt is introduced tangentially into the chamber interior 354 through openings 362 communicating annular plenum 364 leading from molten salt inlet 366 with the chamber interior. The salt is passed spirally inward to outlet 368 as the molten lead passes spirally outward, the two fluids being separated by centrifugal forces attending their spiraling movement, which tend to force the molten lead out and the molten salt in by displacement. As in the vertical embodiment the apparatus is jacketed by a wall 370 which defines a flow passage 372 for steam entering at inlet 374 and exiting at 348 which combined with the lead in space 356 protects the chamber 342 supports and heats process fluids at the same time. Also as in the vertical embodiment, each fluid is introduced and dispersed in the other as the continuous phase and then coalesced from its dispersion to form the continuous phase.

In practice both the vertical heat exchanger of FIG. 8 and the discoid embodiment of FIG. 9 contain in one portion a salt continuous phase and a discontinuous liquid metal phase, adjacent the point of introduction of the liquid metal into the salt; and a liquid metal continuous phase and a salt discontinuous phase adjacent the point of introduction of the molten salt into the liquid metal. That is each fluid is introduced into the other by spraying or otherwise to be dispersed, and in passage through the heat exchanger the dispersed fluid particles or droplets coalesce and combine into a continuous phase. Thus the heat transfer is maximized between the phases. The level of the interface region between (lower) continuous metal phase and (upper) continuous salt phase will vary in particular heat exchangers, determined by the extent of displacement of the salt by the falling to the bottom of the heat exchanger.

STEAM HEAT EXCHANGE

The aforedescribed salt-lead heat exchangers may be used to like effect as the heat exchanger 70 (FIG. 2) with steam being the relatively less dense fluid rather than salt. The lead if desired may be scavenged of salt traces prior to entering the heat exchanger 70 (FIG. 2) to avoid contamination of the steam which is to be used to drive a turbine generator. In general, the molten lead supplied to the heat exchanger 70 from a FIG. 8 or FIG. 9 heat exchanger will be at a temperature of between 800° and 1000° C and a pressure between about 40 to 200 atmospheres. The steam entering the heat exchange will be between 150° and 250° C in temperature and at the pressure of the lead approximately. Exiting from the heat exchanger 70 will be lead at between 350° and 400° C and 2-5 atmospheres lower pressure, and steam at about 10-200 atmospheres and between 650° and 800° C.

ORE SMELTING

As mentioned above, the source of oxygen for fuel reactant combustion can be an ore, such as nickel or iron ore, with the smelting of the ore occurring simultaneously with the combustion of the fuel reactant. For this purpose and with reference to FIG. 2 ore in finely comminuted form is introduced into the reactor 12 through line 13 to be intermixed with the molten salt solution, in lieu of air from line 10. The reduction of ore proceeds and metal resulting is taken off at line 15; the combustion gases are separated through line 34, as in the air oxidizer embodiment.

FLUID SEALING

At various points in the process it will be desirable to have pumps and other apparatus which have impellers on rotating shafts in contact with the high pressure fluid systems described herein. To protect shaft driving motors and the general apparatus environment against leakage from the process vessels and to supplement and augment conventional O-ring seals, there is provided an improved shaft seal shown in FIG. 10. With reference to FIG. 10 the apparatus chamber 400 is illustrative of a pump housing or the like and includes a shaft 402 driven rotatably by a motor (not shown) in bearing 404. A packing gland 406 seals the shaft 402. The packing gland 406 comprises a block 408 having a bore 410 closely surrounding the shaft 402 and radially enlarged at 412 to accommodate a first O-ring seal 414 which bears against the shaft in sealing relation, and spaced axially therefrom in radial enlargement 413 a second O-ring seal 416 which likewise bears against the shaft. Between the O-rings 414 and 416 there is provided a passageway 418 through the block 408 including an inlet portion 420, a pair of coaxial annular recesses 422, 424, and an outlet portion 426. In operation, a fluid under high pressure, e.g. not less than the fluid pressure with the chamber 400, and at a lower temperature, is forced through the passageway 418 pressurizing the O-rings 414, 416. Leakage through the O-ring 414 is thus toward the chamber 400. The fluid in passageway 418 is selected to be compatible with the particular fluid in the chamber 400 and lower melting e.g. if the chamber fluid is molten lead, Wood's metal may be used in the passageway; if the chamber fluid is molten salt, a hydrate of that salt, which is lower melting, may be used in the passageway. In this manner the seals 414, 416 may be fluid pressurized with a system-fluid compatible material, and while being protected against the higher temperatures of the system fluids. That is the salt hydrate being lower melting can be circulated through the passageway 418 at a temperature well below that of its nonhydrated molten salt, and the heat exposure therefore of the O-ring seals 414, 416 is correspondingly less and thus life correspondingly greater.

EXAMPLE

A molten salt system comprising mixed lithium, sodium, potassium and magnesium chlorides and heated to a molten condition at between 375° and 400° C is blended with shearing with coal of the bituminous type suitably prepulverized until solubilized into a single phase homogenate.

The dissolved coal is initially treated to drive off volatiles at 400° and 10 atmospheres. The molten salt solution of the coal residuals, typically low hydrogen polynucleated aromatics is passed to the combustion reactor when the coal residual is burned, by passing air or other oxidizing gas differentially through the molten salt-fuel reactant oxidizing fuel and heating the molten salt to the range of 900–1000 C. The exhaust gases have their heat extracted through heat exchangers. The heat content of the molten salt is extracted by a double cascade of direct contact (fluid commingling) heat exchangers which transfer the heat content from salt, to liquid metal, to steam to produce steam for a steam turbine with the steam being continuously recycled. The molten salt having yielded its heat is recycled, again at about 375° to 400° to the solubilization zone for recharging with fresh feedstock.

SUMMARY OF ADVANTAGES

The described process and apparatus provides a novel and highly advantageous system particularly for the combustion of coal, coal residues and petroleum residues and for the transfer of heat in the most rapid and efficient way, to steam, for the generation of power. Among the several outstanding benefits of the process and apparatus are minimal size, weight, and cost, limited requirement for imported power to the process, maximal utilization of available energies through the process, and minimal loss of energy, i.e. heat, to the atmosphere, all while obtaining maximum heat from the feedstock, without air pollution hazards.

I claim:

1. In the process for the generation and recovery of heat from highly aromatic, refractory carbonaceous fuel reactants which includes oxidizing the fuel in a molten salt matrix within a reaction zone and recovering heat of combustion from the salt matrix, dissolving the fuel in the salt to form a salt-fuel reactant solution, passing an oxidizing gas through said reactant solution to effect said oxidation, exhausting hot combustion gases from said solution, expanding and cooling said combustion gases through an expansion motor, and compressing said oxidizing gas with the energy of said expansion in advance of passing the same through said reactant solution.

2. The process according to claim 1 in which said gas is free oxygen containing.

3. The process according to claim 2 in which said gas is air.

4. The process according to claim 2 including also preheating and compressing said oxidizing gas in advance of passage through said salt solution.

5. The process according to claim 1 including also heat exchanging said hot combustion gases with said compressed oxidizing gas being passed to the salt-fuel solution, in advance of expanding and cooling said hot combustion gases.

6. The process according to claim 5 including also heat exchanging expanded and cooled combustion gases with said compressed oxidizing gas prior to further heat exchange with hot combustion gases.

7. Apparatus for the generation and recovery of heat from highly aromatic, refractory carbonaceous fuel reactants, said apparatus comprising a reactor, means for mixing said fuel reactants into molten salt to form a salt-fuel reactant solution, means for introducing said solution into the reactor, said reactor defining a through passage for the salt-fuel reactant solution, means to pass a free oxygen-containing gas through said reactor differentially to the salt-fuel reactant solution in combustion heat absorbing relation, means to pass exhaust gases from said reactor, means to expand and do work with said exhaust gases including the compression and heating of said free-oxygen containing gas passed into the reactor; means beyond said reactor to transfer said heat from said salt including a high specific heat fluid; and means to recharge said molten salt with fresh fuel reactant following heat transfer and to return said recharged salt to said reactor.

8. Apparatus according to claim 7 including also a turbo-expander and compressor and means to pass exhaust gases through the expander and means to pass free oxygen containing gas through the compressor, said expander being coupled to said compressor to compress said free oxygen containing gas with the expansion energy of said exhaust gases.

9. Apparatus according to claim 8 including also means to pass said high specific heat fluid across the external surface of reactor to absorb heat emanated therefrom.

10. Apparatus according to claim 9 including also means to pass said oxygen containing gas in indirect heat transfer relation with said fluid to preheat said gas for said reactor.

11. Apparatus according to claim 10 in which said reactor is generally cylindrical and provided with a salt-fuel solution inlet, and including also a first external jacket enclosing said reactor and a second external jacket enclosing said first jacket; said first jacket defining a flow passage for said heat transfer fluid; said second jacket communicating with said reactor interior and defining a flow passage for said gas to said reactor interior.

12. Apparatus according to claim 11 in which said reactor terminates in a salt receiving receptacle having a salt outlet opposite the salt-fuel solution inlet and including also gas inlets adjacently inward of said receptacle.

13. Apparatus according to claim 7 including also means to disperse said salt-fuel solution into droplets moving differentially past said gas within said reactor.

14. Apparatus according to claim 13 in which said reactor is extended and said salt-fuel solution is introduced at one terminus of said reactor, and including also means introducing said gas through an inlet at the opposed terminus of said reactor.

15. Apparatus according to claim 14 in which said reactor is vertically extended and said salt-fuel solution droplet-dispensing inlet is located at the upper end of said reactor, and including also means to pass said gas upward through said reactor at a rate suspending said droplets in dynamic equilibrium in a zone adjacent the gas inlet to said reactor.

16. Apparatus according to claim 15 in which said gas is preheated indirectly by heat of combustion in advance of introduction into said reactor.

17. Apparatus according to claim 16 including also means passing said heat transfer fluid between said reactor and said gas as an indirect heat transfer medium.

18. Apparatus according to claim 14 in which said reactor is discoid and said salt-fuel solution droplet dispensing inlet is located at the central portion of said reactor, and including also means to pass said gas inward through said reactor at a rate and in a direction suspending said droplets in dynamic equilibrium in an annular zone adjacent the gas inlet to said reactor.

19. Apparatus according to claim 18 in which said reactor further includes at its periphery a tangentially oriented gas inlet means and a gas outlet means at the central portion thereof arranged to pass gas along a spiral path inwardly through said reactor.

20. Apparatus according to claim 19 including opposed upper and lower salt-fuel solution inlet nozzles angularly related to intersect streams of said solution for dispersion thereof within said reactor.

21. Apparatus according to claim 19 including also means to preheat gas to be introduced into said reactor with heat emanated from said reactor.

22. Apparatus according to claim 19 in which said reactor includes external support structure and including also means to pass heat transfer fluid across the reactor external surface to absorb heat emanated from said reactor to protect said external support structure.

23. Apparatus according to claim 22 including also means to transfer heat indirectly from said heat transfer fluid to said gas to be introduced into said reactor to preheat said gas.

24. Apparatus according to claim 23 including also a first jacket generally enclosing said discoid reactor, a second jacket generally enclosing said first jacket, said first jacket defining a passage for said heat transfer fluid in heat transfer relation with said reactor; said second jacket defining a through passage in heat transfer relation to said first passage for gas to be introduced into said reactor; and including also a gas inlet port communicating said gas passage jacket with the reactor interior in fluid free relation through said first jacket and radially inward of said salt collector.

25. Apparatus according to claim 8 including also means to heat exchange said exhaust gases before and after their expansion with compressed free oxygen containing gas.

26. In the process for the generation and recovery of heat from highly aromatic, refractory carbonaceous fuel reactants which includes oxidizing the fuel in a molten salt matrix within a reaction zone and recovering heat of combustion from the salt matrix, circulating said molten salt to and from said reaction zone to bring fresh charges of fuel reactant into the zone and heat out of the zone in a reaction stream loop, dissolving the fuel charges in the salt to form a salt-fuel reactant solution in said loop for reactant oxidation in said zone, circulating metallic liquid sequentially through said salt in differential flow relation to heat exchange said metallic liquid with said salt, through steam to transfer exchanged heat of combustion thereto, and back through said salt solution in a heat transfer loop, and circulating said heated steam to a steam energy consuming loop to recover heat and back in a steam loop to said heat transfer loop for regeneration of heated steam.

27. The process according to claim 26 in which the fuel reactant is subanthracite coal and including also preheating said fuel reactant in the molten salt in advance to the reaction zone to substantially free the reactant of components volatile at 400° C and 10 atmospheres.

28. The process according to claim 26 including also passing said metallic liquid in heat exchange relation over the exterior surfaces of the reaction zone.

29. The process according to claim 19 including also passing said metallic liquid in indirect heat exchange relation over the exterior surfaces of the reaction zone.

30. The process according to claim 26 including also passing said salt and metallic liquid countercurrently along an extended heat exchange path and differentially at opposite ends of said path to maintain relatively longer contact of the metallic liquid with the salt at maximum temperature and relatively shorter contact thereof with minimum temperature salt along the path.

31. The process according to claim 30 in which said metallic liquid is dispersed throughout said salt in a multiplicity of different mass droplets, and including also subjecting said droplets to opposing forces along said path, one of which forces is proportional to the specific mass of said droplets, and segregating said droplets by their specific mass for separation of the greater mass droplets selectively.

32. The process according to claim 26 in which said metallic liquid is lead and including also alternately dispersing said lead into droplets in the salt for reception of heat and coalescing for separation from the salt.

33. The process according to claim 32 in which differential flow of salt and the lead droplets therein is maintained by balancing forces acting on said lead in a manner relatively increasing the lead exposure to maximum temperature salt and relatively decreasing the lead exposure to minimum temperature salt and responsive to the mass of the droplets so that upon coalescence of the droplets they are separable from the salt.

34. The process according to claim 33 including also passing said liquid lead over the exterior surfaces of the reaction zone to retain heat normally emanated from said zone in the process.

35. The process according to claim 34 including also passing a free oxygen containing gas in indirect heat exchange with the liquid lead at the exterior surface of the reaction zone, and passing said gas through preheat into the reaction zone to oxidize the fuel reactant therein 36. The process according to claim 35 in which the reaction zone is vertically extended and including also within the reaction zone raining molten salt-fuel reactant solution in droplet form through an updraft of air as the oxidizing gas, and collecting molten salt containing the heat of combustion at the lower reaches of the reaction zone.

37. The process according to claim 36 including also balancing the gravitational forces acting on the falling molten salt-fuel reactant solution droplets with the force of air to suspend temporarily the droplets above the lower reaches of the reaction zone for a time to substantially free the salt of fuel reactant.

38. The process according to claim 35 in which the reaction zone is discoid and including also introducing said molten salt-fuel reactant centrally thereof for outward passage through the reaction zone in droplet form, introducing air tangentially at the periphery of said reaction zone along a spiral path extending toward the center of said zone in a manner entraining said salt solution-fuel reactant droplets for passage toward the center of said zone, and simultaneously subjecting said droplets to centrifugal forces opposing such passage, and collecting molten salt containing heat of combustion at the peripheral reaches of said reaction zone.

39. The process according to claim 38 including also balancing the centrifugal forces acting on the molten salt-fuel reactant solution droplets with the force of air to suspend temporarily the droplets inwardly of the reaction zone periphery for a time to substantially free the salt of fuel reactant.

40. Apparatus for the generation and recovery of heat from highly aromatic, refractory carbonaceous fuel reactants; said apparatus comprising a reactor, means for mixing said fuel reactants into molten salt to form a salt-fuel reactant solution, means for introducing said solution into the reactor, said reactor defining a through passage for the salt-fuel reactant solution, means to pass a free oxygen-containing gas through said reactor differentially to the salt fuel reactant solution in combustion heat absorbing relation, means to pass exhaust gases from said reactor, means to recharge said molten salt with fresh fuel reactant following heat transfer and to return said recharged salt to said reactor and means beyond said reactor to transfer said heat from said salt comprising a first heat exchanger, a second heat exchanger, and loop means passing a high specific heat fluid medium through said first heat exchanger with said salt in heat transferring relation, and through said second heat exchanger with steam, to transfer the salt heat to said steam through said fluid medium; and steam turbine means adapted to receive steam from said second heat exchanger.

41. Apparatus according to claim 40 in which said high specific heat fluid comprises a metallic liquid and including also means to pass said liquid into and out of heat exchange contact with salt in said heat exchanger, and second heat exchange means to transfer heat from said metallic liquid steam.

42. Apparatus according to claim 41 in which said first heat exchanger is a direct contact heat exchanger.

43. Apparatus according to claim 41 in which said second heat exchanger is a direct contact heat exchanger.

44. Apparatus according to claim 43 in which said first heat exchanger is a direct contact heat exchanger.

45. Apparatus according to claim 44 in which said first heat exchanger comprises an extended exchange chamber and means to pass said salt and said metallic liquid differentially through said exchange chamber.

46. Apparatus according to claim 45 in which said first heat exchanger comprises a vertically elongated exchange chamber having a metallic liquid inlet at the upper portion thereof and a metallic liquid outlet at the lower portion thereof, said chamber further having a salt inlet at the lower portion thereof and a salt outlet at the upper portion thereof for passage of salt upwardly through the chamber, and means at the metallic liquid inlet to disperse the liquid into and through the upward moving salt and at the liquid outlet to recover said liquid, coalesced and with the transferred heat of said salt.

47. Apparatus according to claim 46 in which the metallic liquid is molten lead.

48. Apparatus according to claim 45 in which said second heat exchanger comprises means to intimately interdisperse said metallic liquid and steam to transfer said salt heat contained by said liquid thereby to said steam.

49. Apparatus according to claim 47 in which said second heat exchanger comprises means to intimately interdisperse said lead and steam to transfer said salt heat contained in said lead thereby to said steam.

50. Apparatus according to claim 40 including also means to recycle steam from the steam turbine to the second heat exchanger for reheating.

51. Apparatus according to claim 45 in which said first heat exchanger includes external support structure and including also means to pass relatively cooler heat transferring metallic liquid over the external surface of said first heat exchanger to absorb heat radiated from said heat exchange to protect the external support structure thereof.

52. Apparatus according to claim 51 including a first jacket generally enclosing said first heat exchange means, said jacket defining a flow passage for said metallic liquid.

53. Apparatus according to claim 52 including also means to pass process steam in heat transferring relation across the external surface of said first heat exchanger.

54. Apparatus according to claim 53 including a second jacket generally enclosing said first jacket and defining a passage for process steam in heat transfer relation with the metallic liquid in said first jacket.

* * * * *